US012791201B2

(12) United States Patent
Park et al.

(10) Patent No.: US 12,791,201 B2
(45) Date of Patent: Nov. 10, 2026

(54) AIR HEATING APPARATUS

(71) Applicant: KYUNGDONG NAVIEN CO., LTD., Pyeongtaek-si (KR)

(72) Inventors: Jun Kyu Park, Seoul (KR); Duck Sik Park, Seoul (KR); Dong Hwan Kim, Seoul (KR); Seong Sik Moon, Seoul (KR)

(73) Assignee: KYUNGDONG NAVIEN CO., LTD., Pyeongtaek-si (KR)

( * ) Notice: Subject to any disclaimer, the term of this patent is extended or adjusted under 35 U.S.C. 154(b) by 1106 days.

(21) Appl. No.: 17/530,020

(22) Filed: Nov. 18, 2021

(65) Prior Publication Data

US 2022/0178553 A1 Jun. 9, 2022

(30) Foreign Application Priority Data

Dec. 3, 2020 (KR) ........................ 10-2020-0167406
Sep. 8, 2021 (KR) ........................ 10-2021-0119779
Oct. 21, 2021 (KR) ........................ 10-2021-0141260

(51) Int. Cl.
*F24D 9/00* (2022.01)
*F24D 3/02* (2006.01)
(Continued)

(52) U.S. Cl.
CPC ............. *F24D 9/00* (2013.01); *F24D 3/1083* (2013.01); *F24D 19/1015* (2013.01); *F24H 8/00* (2013.01);
(Continued)

(58) Field of Classification Search
CPC ...... F24D 9/00; F24D 3/1083; F24D 19/1015; F24D 3/1008; F24D 2220/042;
(Continued)

(56) References Cited

U.S. PATENT DOCUMENTS 3,134,543 A * 5/1964 Carlson ..................... F22B 1/22 237/63
4,449,511 A * 5/1984 Hays ......................... F24H 8/00 126/117
(Continued)

FOREIGN PATENT DOCUMENTS

CN 209130848 U * 7/2019
JP H09210378 A 8/1997
(Continued)

OTHER PUBLICATIONS

Chinese to English machine translation for CN_209130848_U (Year: 2019).*
(Continued)

*Primary Examiner* — Michael G Hoang
*Assistant Examiner* — Elizabeth Ann Laughlin
(74) *Attorney, Agent, or Firm* — ALG Intellectual Property, LLC

(57) ABSTRACT

Disclosed is an air heating apparatus including a burner that causes a combustion reaction, a main passage, through which water flows while circulating, a heat exchanging device that receives heat from combustion gas generated by the combustion reaction and heats the water flowing along the main passage, a heating heat exchanger that receives the water heated by the heat exchanging device and exchanges heat with the air for heating, a fan that blows the air to the heating heat exchanger, and an expansion tank disposed in the main passage to accommodate a change in a volume of the water and having an expansion opening opened to an outside.

14 Claims, 15 Drawing Sheets

(51) Int. Cl.

| | |
|---|---|
| ***F24D 3/10*** | (2006.01) |
| ***F24D 19/10*** | (2006.01) |
| ***F24H 8/00*** | (2022.01) |
| ***G05B 15/02*** | (2006.01) |

(52) U.S. Cl.

CPC ................ *G05B 15/02* (2013.01); *F24D 3/02* (2013.01); *F24D 3/1008* (2013.01); *F24D 2220/042* (2013.01); *F24D 2220/044* (2013.01); *F24D 2220/048* (2013.01); *F28F 2250/106* (2013.01)

(58) Field of Classification Search

CPC ......... F24D 2220/044; F24D 2220/048; F24D 11/004; F24D 11/002; F24D 19/1006; F24D 3/02; F24D 5/02; G05B 15/02; F28F 2250/106; F28F 21/083; F28F 3/02; F28F 9/013; F28F 1/0477; F28F 2210/10; F24H 8/00; F24H 3/087; F24H 3/085; F24H 9/2085; F28D 1/02; F28D 1/047

USPC ........................................................ 126/112

See application file for complete search history.

(56) References Cited

U.S. PATENT DOCUMENTS

| | | | | |
|---|---|---|---|---|
| 4,478,206 | A | 10/1984 | Ahn | |
| 4,502,626 | A | 3/1985 | Gerstmann et al. | |
| 5,544,645 | A | 8/1996 | Armijo et al. | |
| 5,778,829 | A * | 7/1998 | Min | F24H 9/144 122/6 R |
| 5,948,279 | A | 9/1999 | Chang et al. | |
| 5,979,372 | A * | 11/1999 | Park | F24D 3/10 122/504 |
| 6,820,685 | B1 | 11/2004 | Carter et al. | |
| 2001/0048032 | A1 * | 12/2001 | Macintyre | F24D 12/02 237/16 |
| 2008/0061160 | A1 * | 3/2008 | Ootomo | F24H 9/14 237/8 R |
| 2014/0230477 | A1 * | 8/2014 | Furui | F24D 5/02 62/434 |
| 2016/0209052 | A1 * | 7/2016 | Heo | F24D 19/1006 |
| 2017/0059205 | A1 | 3/2017 | Kim | |
| 2018/0059746 | A1 * | 3/2018 | Sato | H05K 7/20836 |
| 2018/0195763 | A1 | 7/2018 | Sarkis, Sr. | |
| 2019/0368818 | A1 | 12/2019 | Wada et al. | |
| 2021/0247103 | A1 | 8/2021 | Park et al. | |

FOREIGN PATENT DOCUMENTS

| | | | | |
|---|---|---|---|---|
| JP | H10505404 | A | | 5/1998 |
| JP | 2006162121 | A | * | 6/2006 |
| JP | 2012202596 | A | | 10/2012 |
| KR | 100292457 | B1 | | 6/2001 |
| KR | 100406134 | B1 | | 11/2003 |
| KR | 100659689 | B1 | | 12/2006 |
| KR | 101586646 | B1 | | 1/2016 |
| KR | 20170022466 | | | 3/2017 |
| KR | 1020190138553 | A | | 12/2019 |

OTHER PUBLICATIONS

Japanese to English machine translation of JP_2006162121_A.*

Non-Final Office Action received in U.S. Appl. No. 17/530,098 on Jul. 24, 2024.

Non-Final Office Action received in U.S. Appl. No. 17/530,151 on Feb. 21, 2025.

Office Action received in KR Patent Application No. 1020210172240 on Jan. 7, 2026.

Office Action received in KR Patent Application No. 1020210172241 on Jan. 8, 2026.

Office Action received in KR Patent Application No. 1020210172243 on Jan. 7, 2026.

* cited by examiner

AIR HEATING APPARATUS

CROSS-REFERENCE TO RELATED APPLICATION

This application claims the benefits of priorities to Korean Patent Application Nos. 10-2020-0167406, 10-2021-0119779 and 10-2021-0141260, filed in the Korean Intellectual Property Office on Dec. 3, 2020, Sep. 8, 2021 and Oct. 21, 2021, respectively, the entire contents of which are incorporated herein by reference.

TECHNICAL FIELD

The present disclosure relates to an air heating apparatus for heating.

BACKGROUND

FIG. 1 is a view illustrating a structure of a conventional gas furnace. FIG. 2 is a view illustrating a situation, in which a pipeline of a conventional gas furnace is damaged.

In houses of the Northern America, heating may be performed through a scheme of supplying heated air by using ducts connected to respective rooms. For heating air, an apparatus called a gas furnace is generally used. The gas furnace may supply heat in a scheme of delivering heat formed by burning a fuel to air, and distributing the heated air to respective rooms. The gas furnace generally uses a scheme of exchanging heat between air and combustion gas in a heat exchanger to heat air, by causing the combustion gas of high temperature generated through a combustion reaction of a burner 101 into an interior of a pipeline 102 included in the heat exchanger and causing the air to flow around the pipeline 102.

When the combustion gas is provided to exchange heat with the air in the heat exchanger of the gas furnace, the pipeline 102 that constitutes the heat exchanger may be formed of a material, such as aluminum, such that the combustion gas of high temperature passes therethrough. However, in this case, because the pipeline 102 may repeatedly experience thermal expansion and contraction, a crack CR that is formed as a portion of the pipeline 102 is destructed may be caused. Furthermore, a flow rate of air that may cool the pipeline 102 becomes insufficient when a filter disposed in a fan that circulates air is blocked by dust and the like, the pipeline 102 may be overheated to be excessively thermally expanded and contracted, or whereby a crack CR may be caused due to high-temperature oxidation thereof. When the crack CR is formed, the combustion gas is leaked to an outside of the pipeline 102 as it is, and may flow around the pipeline 102 and be mixed with the air provided to the respective rooms. When incomplete combustion occurs, the combustion gas may include carbon monoxide, and when the carbon monoxide is leaked and mixed with the air provided to the respective rooms, it may be a fatal dangerous factor to human bodies.

Furthermore, because surrounding moisture evaporates due to the excessively heated air when the air is heated by using the gas furnace of the above-described scheme, the air may be provided to the respective rooms in a very dried state. Accordingly, because it makes the air of the house very dry, it is necessary to humidify the air by using a separate humidity adjusting device. In particular, when a person having an allergy is in the house, he or she may have problems due to dryness caused by the air dried by the gas furnace and dust generated frequently.

The above-described gas furnace may have a turn-down ratio (TDT), which is a minimum thermal capacity that may be controlled as compared with a maximum thermal capacity, of 2:1, or may be simply switched on or off. Accordingly, in a situation, in which a heating load of a low level is required, an unnecessary over-operation is performed. Operation noise may be generated due to the over-operation, and because a space for supplying a calorie that is higher than necessary or a calorie that is lower than necessary is large in consideration of an entire operation time, an operation may be performed inefficiently. Because the gas furnace has a low efficiency, excessive operation costs may be caused.

In addition to the gas furnace, another system for heating air may be considered. The system for heating air may include an external heat source that heats a thermal medium by generating heat, an air handling unit that blows air and heats the air by using the thermal medium heated by the external heat source, and a pipeline that may communicate with the thermal medium by connecting the external heat source and the air handling unit. When the system for heating air is used, the external heat source and the air handling unit are disposed separately, and thus a large space for installation may be necessary. Furthermore, the pipeline exposed to an outside may be damaged, and excessive costs may be necessary because a pipeline of a very large length may be required according to locations, at which the external heat source and the air handling unit are disposed. When the thermal medium flows through the long pipeline, a heat loss may occur in a process of the thermal medium passing through the pipeline.

The above-described system for heating air may be controlled by using a contact type interworking scheme. In this case, the system may be simply operated in one of two stages of a low stage and a high stage or may be operated in one of two stages of an on stage and an off stage, in which heating is performed or not performed, because information on the thermal medium dealt in the external heat source and information on the air dealt in the air handing unit do not interwork with each other, and a precise control cannot be made and a loss may occur in an aspect of thermal efficiency. To cause controls of the external heat source and the air handling unit to interwork with each other to solve the inconvenience, a new inconvenience of having to manually adjusting various settings occurs. Furthermore, the external heat source and the air handling unit themselves basically are not devices that are provided for mutual interworking, subsidiary components, such as a thermostat, for acquiring information that is necessary for the control from the external heat source or the air handling unit have to be additionally installed, and the installed subsidiary components have to be properly installed in the constituent element included in the system and be connected. The complex processes may not be easily performed and may cause connection errors and defects.

SUMMARY

The present disclosure has been made to solve the above-mentioned problems occurring in the prior art while advantages achieved by the prior art are maintained intact.

An aspect of the present disclosure provides an air heating apparatus that heats air by using water.

Another aspect of the present disclosure provides an air heating apparatus that reduces a danger of leaking combustion gas, which is provided to respective rooms.

Another aspect of the present disclosure provides an air heating apparatus that may provide heated air such that the air is prevented from being dried without a separate humidity adjusting device.

Another aspect of the present disclosure provides an air heating apparatus that increases efficiency with a high turndown ratio and reduces operation noise.

Another aspect of the present disclosure provides an air heating apparatus that reduces a space for installation, reduces heat loss and necessary costs, and reduces a danger of breakdown.

Another aspect of the present disclosure provides an air heating apparatus, in which a thermal medium and constituent elements related to air easily interwork with each other to be used for control, and which may be easily installed in replacement of an existing gas furnace.

Another aspect of the present disclosure provides an air heating apparatus that has stability as a pressure vessel.

Another aspect of the present disclosure provides an air heating apparatus that may be installed at various sites.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an air heating apparatus includes a burner that causes a combustion reaction, a main passage, through which water flows while circulating, a heat exchanging device that receives heat from combustion gas generated by the combustion reaction and heats the water flowing along the main passage, a heating heat exchanger that receives the water heated by the heat exchanging device and exchanges heat with the air for heating, a fan that blows the air to the heating heat exchanger, and an expansion tank disposed in the main passage to accommodate a change in a volume of the water and having an expansion opening opened to an outside.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
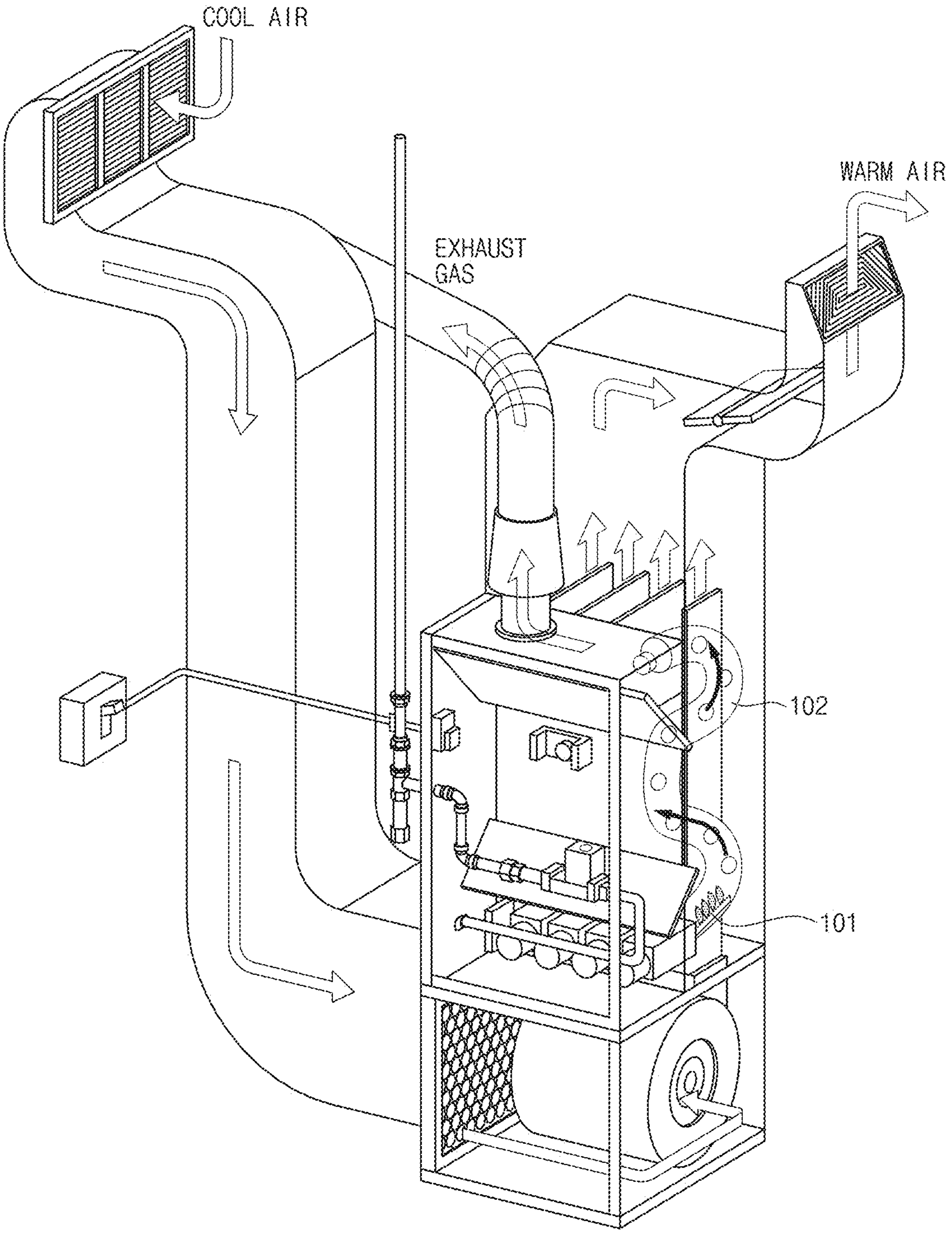
FIG. 1 is a view illustrating a structure of a conventional gas furnace.
Figure 2:
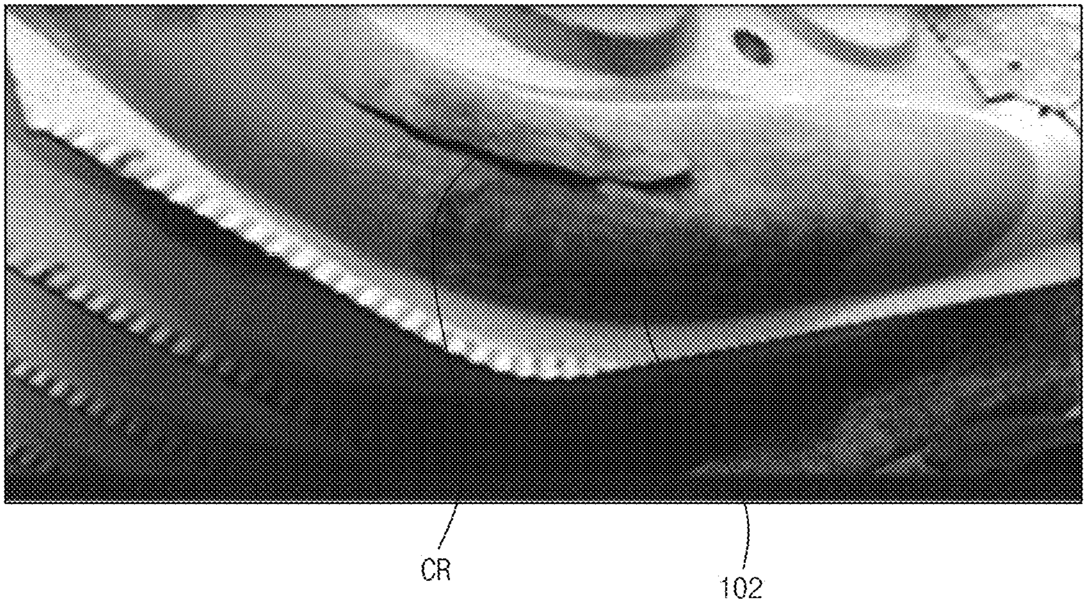
FIG. 2 is a view illustrating a situation, in which a pipeline of a conventional gas furnace is damaged.

Hereinafter, some embodiments of the present disclosure will be described in detail with reference to the exemplary drawings. Throughout the specification, it is noted that the same or like reference numerals denote the same or like components even though they are provided in different drawings. Further, in the following description of the present disclosure, a detailed description of known functions and configurations incorporated herein will be omitted when it may make the subject matter of the present disclosure rather unclear.

Figure 3:
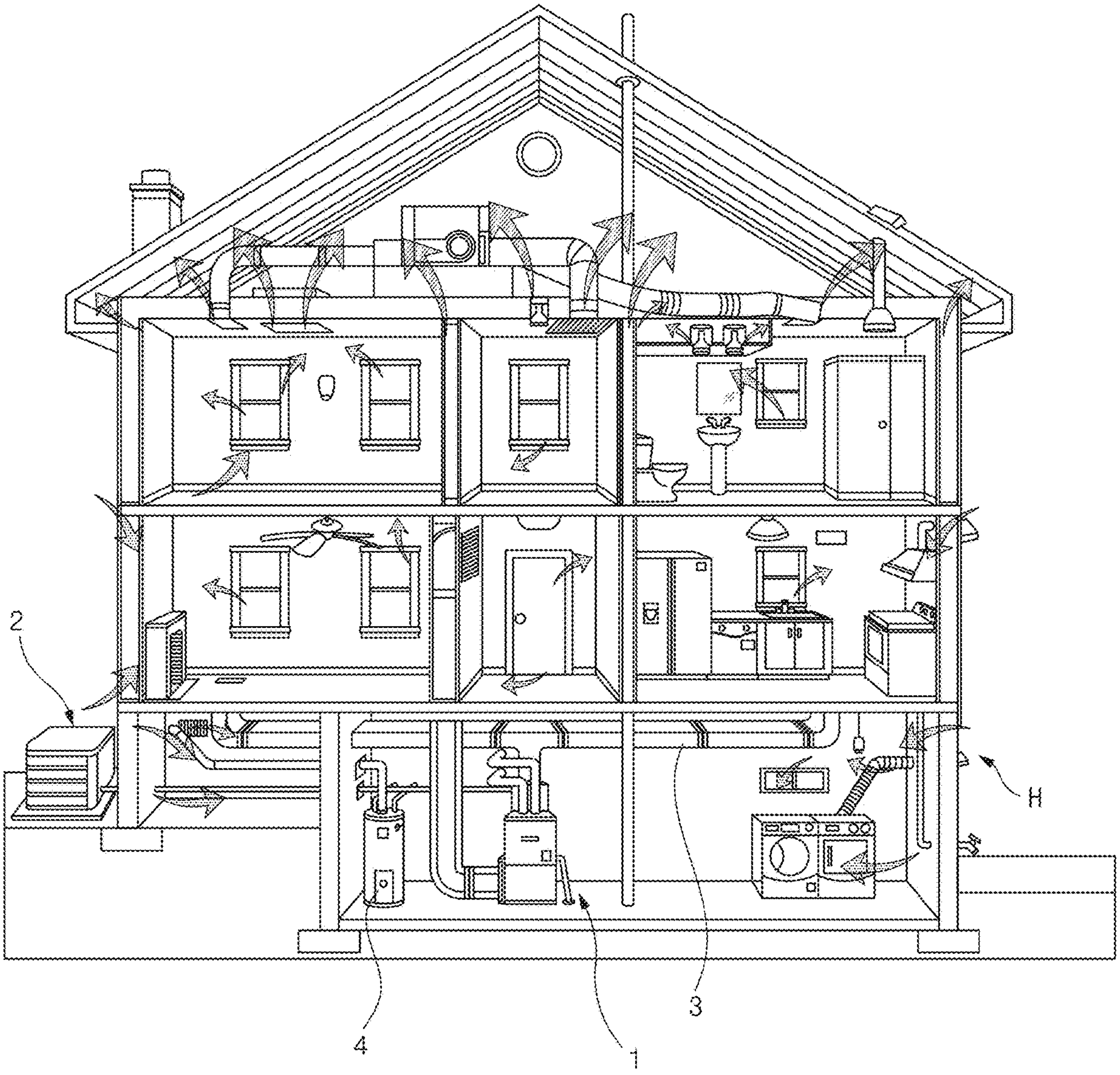
FIG. 3 is a view illustrating a heating system including an air heating apparatus according to a first embodiment of the present disclosure.

FIG. 3 is a view illustrating a heating system including an air heating apparatus 1 according to a first embodiment of the present disclosure.

Referring to the drawings, the heating system including the air heating apparatus 1 according to the first embodiment of the present disclosure may be installed in a house “H”. The heating system may include the air heating apparatus 1 for heating air. The air heating apparatus 1 may be connected to a duct 3 connected to respective rooms of the house “H” and may deliver the heated air to the rooms to perform heating. The air heating apparatus 1 may heat water by using heat generated through a combustion reaction and combustion gas, and may cause the heated water to heat the air in a heat exchanger. The air may be introduced into the air heating apparatus 1 from an outside of the house “H”, or may return to the air heating apparatus 1 via the rooms of the house “H”. The air from the outside of the house “H” may be introduced into the air heating apparatus 1, but a description of the present disclosure will be made in the specification with an assumption that the air basically returns.

The heating system may further include a separate heater 4 for forming hot water, and may have, as an outdoor unit, a condenser 2 that supplies a refrigerant to the air heating apparatus 1 to cause cold air to be supplied through the air heating apparatus 1.

Figure 4:
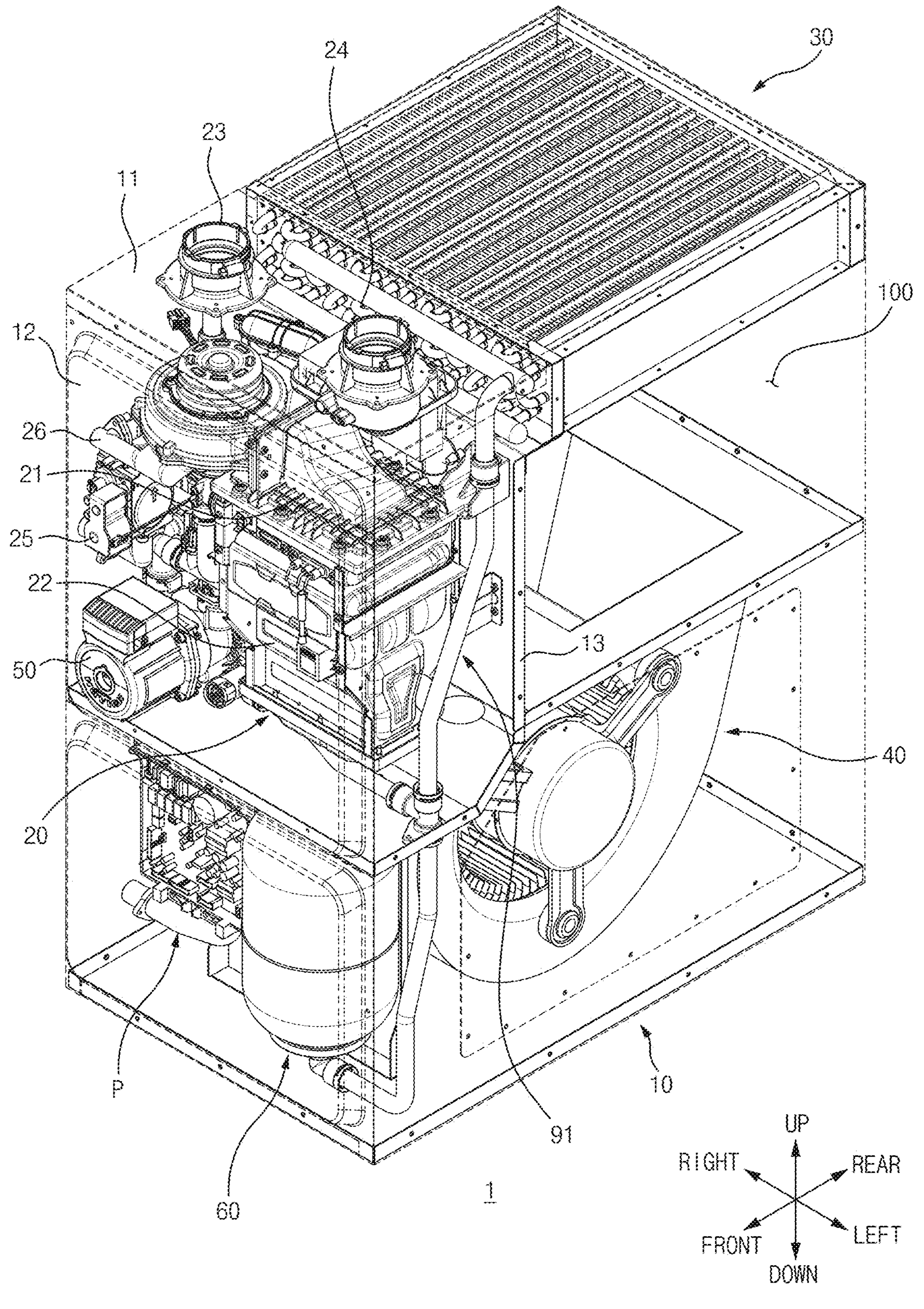
FIG. 4 is a perspective view illustrating an internal structure of the air heating apparatus according to the first embodiment of the present disclosure, which is exposed to an outside.
Figure 5:
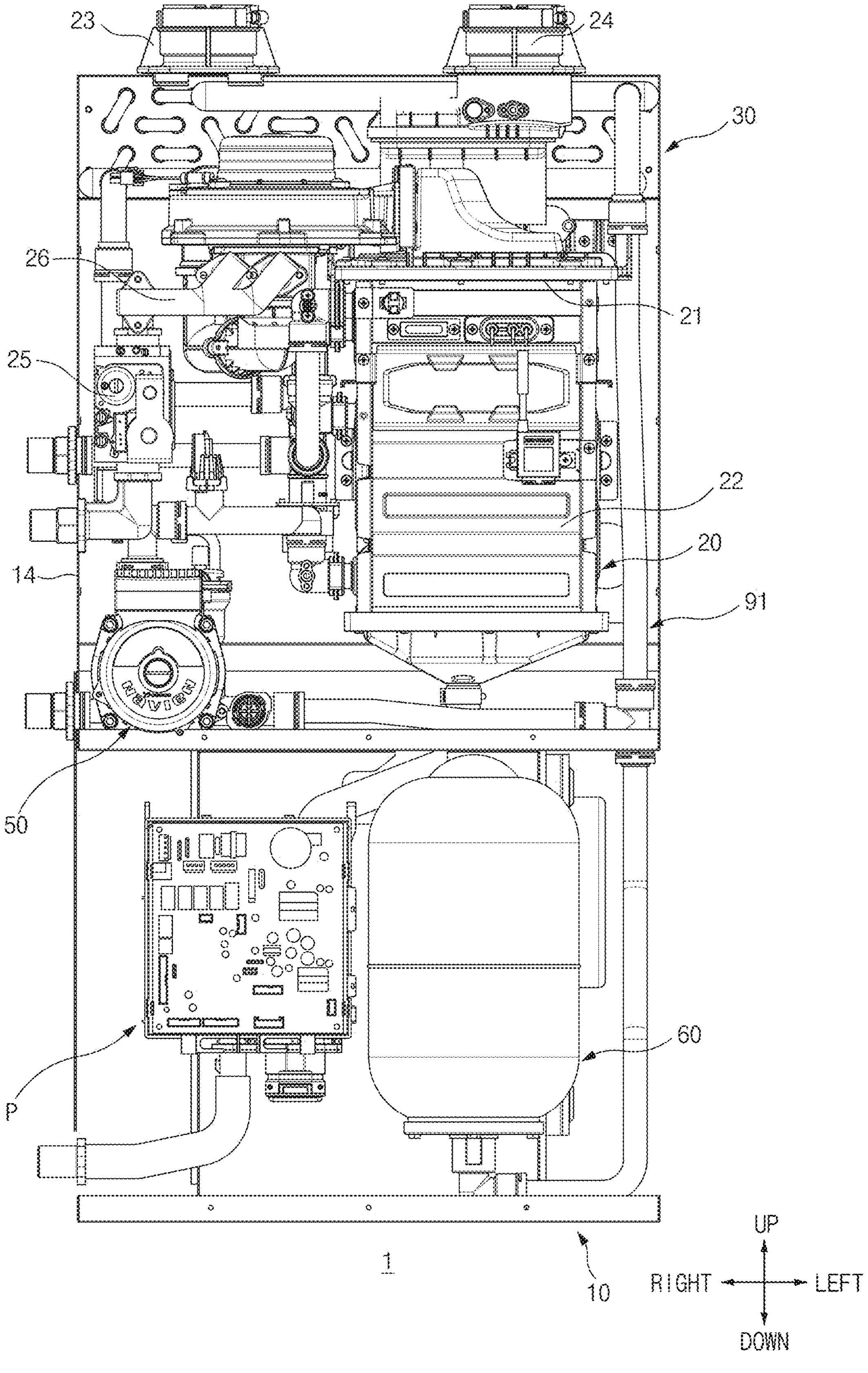
FIG. 5 is a front view of the air heating apparatus according to the first embodiment of the present disclosure, which is viewed from a front side toward a rear side after a front side wall thereof is removed.
Figure 6:
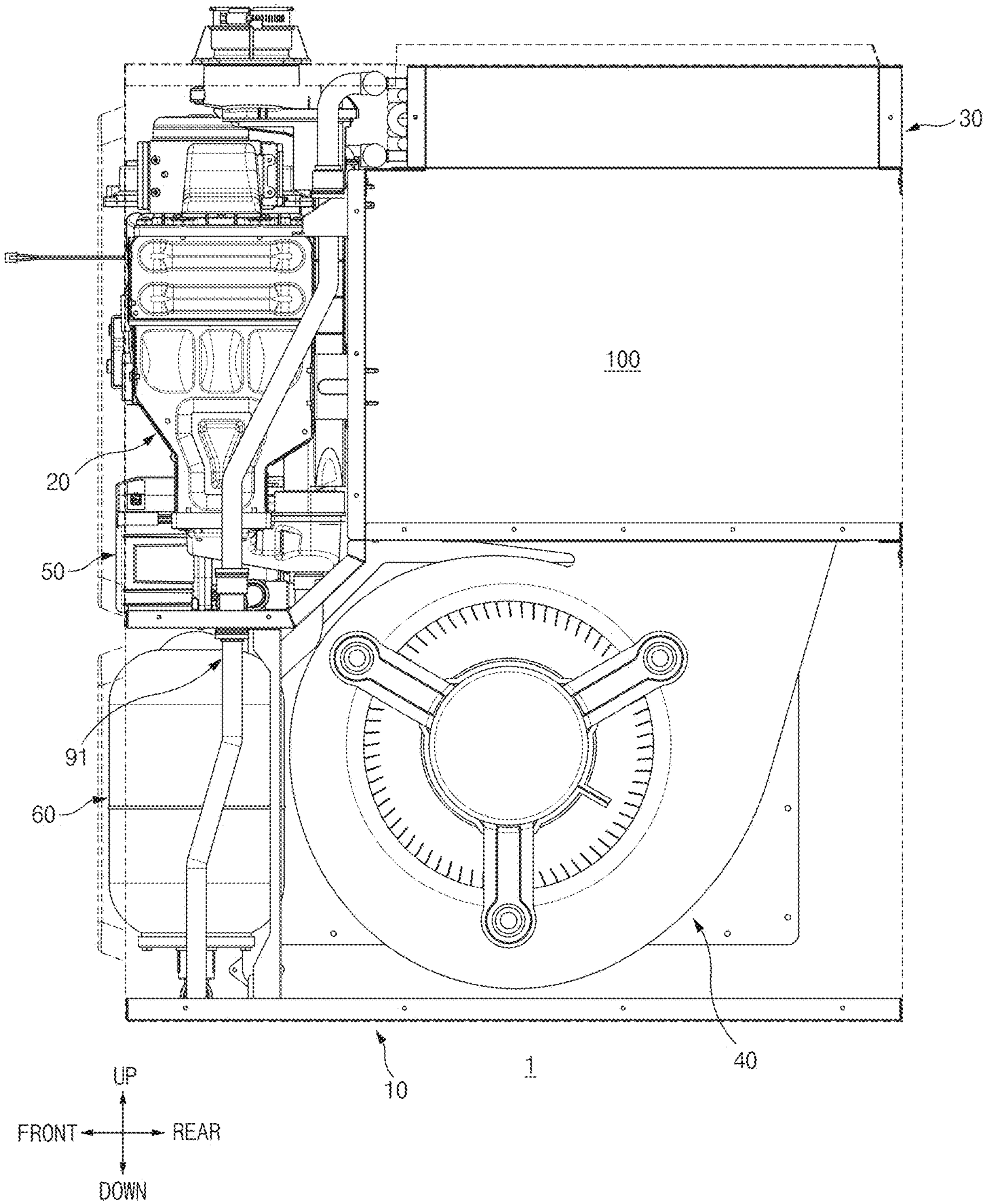
FIG. 6 is a view of the air heating apparatus according to the first embodiment of the present disclosure, which is viewed from a left side toward a right side after a left side wall thereof is removed.

FIG. 4 is a perspective view illustrating an internal structure of the air heating apparatus 1 according to the first embodiment of the present disclosure, which is exposed to an outside. FIG. 5 is a front view of the air heating apparatus 1 according to the first embodiment of the present disclosure, which is viewed from a front side toward a rear side after a front side wall 12 thereof is removed. FIG. 6 is a view of the air heating apparatus 1 according to the first embodiment of the present disclosure, which is viewed from a left side toward a right side after a left side wall thereof is removed.

Referring to the drawings, the air heating apparatus 1 according to the first embodiment of the present disclosure includes a water heater 20, a heating heat exchanger 30, a main passage 90, and a processor "P".

In the specification, forward/rearward, leftward/rightward, and upward/downward directions are referred for convenience of description, and may be directions that are perpendicular to each other. However, the directions are determined relatively with respect to a direction, in which the air heating apparatus 1 is arranged, and the upward/downward direction may not necessarily mean a vertical direction.

Case 10 and Expansion Tank 60

The air heating apparatus 1 according to the first embodiment of the present disclosure may further include the case 10. The case 10 may have a box shape having an interior space configured such that constituent elements, such as the water heater 20, the heating heat exchanger 30, the main passage 90, and the processor "P" of the air heating apparatus 1 are embedded in the interior space thereof, but the shape thereof is not limited thereto. In the first embodiment of the present disclosure, it will be described that the case 10 has a rectangular parallelepiped box shape having walls that are perpendicular to the forward/rearward, leftward/rightward, and upward/downward directions.

The constituent elements of the air heating apparatus 1 may be embedded in an interior of the case 10 such that the air heating apparatus 1 may be integrally formed, and the following effects may be expected. The air heating apparatus 1 according to the first embodiment of the present disclosure does not require many installation spaces, and lengths of the constituent elements that are necessary for connections thereof become shorter whereby necessary costs, a danger of damage of the constituent elements, and heat loss may be reduced. Furthermore, the air heating apparatus 1 according to the first embodiment of the present disclosure may be directly installed in replacement of a conventional gas furnace.

The air heating apparatus 1 according to the first embodiment of the present disclosure may further include the expansion tank 60. The expansion tank 60 is a constituent element that is embedded in the case 10 and connected to the main passage 90, which will be described below, to accommodate a volume change according to a change of a temperature of water. The expansion tank 60 may constitute a portion of a closed circuit that is formed by the main passage 90, and may accommodate expansion of the volume of water that flows along the closed circuit. The expansion tank 60 is of a closed type, and may include a flexible diaphragm in an interior thereof. When temperature changes or water is discharged or introduced in a state, in which water is filled in the expansion tank 60, an internal pressure of the expansion tank 60 may change. The water accommodated in the expansion tank 60 may be provided to other constituent elements along the main passage 90. The expansion tank 60 may be disposed on a lower side of the interior space of the case 10, but a location thereof is not limited thereto.

Partition walls 13 may be formed in the interior space of the case 10 to partition the interior space into a plurality of areas, or support the constituent elements of the air heating apparatus 1. In the first embodiment of the present disclosure, it will be described that the partition walls 13 partition the interior space in the upward/downward and forward/rearward direction such that the water heater 20 and a pump 50 are disposed in an upper area that is adjacent to the front side wall 12, the expansion tank 60 and the processor "P" are disposed in a lower area that is adjacent to the front side wall 12, a fan 40 is disposed in a lower area on a rear side of the interior space, and the heating heat exchanger 30 is disposed in an upper area on the rear side of the interior space, but shapes of the partition walls 13 and the spaces partitioned by the partition walls 13 are not limited thereto.

Water Heater 20

The water heater 20 is a constituent element configured to heat and discharge the introduced water. For heating of the water, the water heater 20 may cause a combustion reaction and may deliver the heat generated through the combustion reaction to the water.

The water heater 20 may include a burner 21 and a heat exchanging device 22. The burner 21 causes the combustion reaction. Accordingly, the burner 21 may receive a fuel and air, and may cause a combustion reaction by forming flames by using an ignition plug in a mixture of the fuel and the air. For the operation, the burner 21 may include a blower that blows air, a fuel nozzle that ejects the fuel, and the ignition plug that causes a spark for ignition. The burner may further include a mixing chamber, and the fuel and the air may be mixed in the mixing chamber. Through the combustion reaction, heat and combustion gas are generated, and the heat and the combustion gas may be delivered to the water. The fuel may be a natural gas, including methane or ethane, which is used for power generation and may be oil, but the kind thereof is not limited thereto. The flames formed by the combustion reaction caused by the burner 21 may be disposed in an interior space of a combustion chamber located on a lower side of the burner 21. An insulator may be disposed in the combustion chamber such that the insulator contacts an inner surface of a side plate of the combustion chamber. The insulator may prevent calories in an interior of the combustion chamber from being leaked to an outside, and may prevent the water heater 20 from being overheated.

The heat exchanging device 22 is disposed to deliver the heat generated by the burner 21 to the water. The heat exchanging device 22 may be disposed on a lower side of the burner 21. The heat exchanging device 22 may include a sensible heat exchanger and a latent heat exchanger. The sensible heat exchanger and the latent heat exchanger may be pin-tube type heat exchangers including a pin and a tube, through which the water flows and may be plate-type heat exchangers formed by stacking a plurality of plates, but the kind thereof is not limited thereto. The water introduced into the heat exchanging device 22 may be heated sequentially via the latent heat exchanger and the sensible heat exchanger. The heat exchanging device 22 may be formed by coupling the sensible heat exchanger and the latent heat exchanger, which are independent each other, and may have an integral condensing heat exchanger, in which the combustion gas may be condensed, and different parts of the condensing heat exchanger may perform functions of the sensible heat exchanger and the latent heat exchanger. Then, the respective parts of the condensing heat exchanger may be referred to as the sensible heat exchanger and the latent heat exchanger, but the classification thereof may not be clear. That is, the condensing heat exchanger may perform functions of the sensible heat exchanger and the latent heat exchanger as a whole.

When the sensible heat exchanger and the latent heat exchanger are constituted by pin-tube type heat exchangers, the pin may be of a plate type and the tube may pass through the pin. A plurality of pins may be disposed to be spaced apart along a direction, in which the tube extends. The combustion gas may flow through spaces between the pin and the pin, and the tube and the tube, and the water may flow through an interior of the tube such that the water and the combustion gas exchange heat.

An interior space of the tube may have a slot shape that is formed long along the upward/downward direction, on a cross-section cut by a plane that is perpendicular to the direction, in which the tube extends. The interior space of the tube may be formed such that a value obtained by dividing an upward/downward height thereof by a width in the forward/rearward direction that is perpendicular to the upward/downward direction on the above cross-section is larger than 2.

The sensible heat exchanger is configured to receive the heat generated by the combustion reaction and heat the water that flows through an interior thereof. Accordingly, the sensible heat exchanger may be disposed adjacent to the burner 21. The sensible heat exchanger may not be blocked to flames, and the combustion gas may pass through the sensible heat exchanger.

The latent heat exchanger is configured to receive the latent heat of the combustion gas generated by the combustion reaction and heat the water that flows through an interior thereof. The latent heat exchanger uses the latent heat of the combustion gas, and delivers heat generated when moisture included in the combustion gas is condensed to the water that flows in an interior of the latent heat exchanger. Accordingly, the latent heat exchanger may be disposed on a downstream side of the sensible heat exchanger with respect to a flow direction of the combustion gas such that the combustion gas, a temperature of which has been decreased as the sensible heat exchanger delivers heat to the water, is condensed. Tubes included in the latent heat exchanger may be disposed at different locations along the flow direction of the combustion gas to generate a plurality of heats.

The sensible heat exchanger and the latent heat exchanger may be disposed in the main passage 60 such that the water is introduced into the sensible heat exchanger via the latent heat exchanger. Accordingly, after being primarily heated in the latent heat exchanger, the water may be secondarily heated in the sensible heat exchanger and be delivered to the heating heat exchanger 30, which will be described below.

The water heater 20 may further include a sensible heat insulating pipeline on an outer side of the sensible heat exchanger. The sensible heat insulating pipeline is a pipeline, in which heating water flows along an interior thereof and which directly or indirectly contacts the sensible heat exchanger to insulate the sensible heat exchanger.

In the water heater 20, the burner 21, the sensible heat exchanger, and the latent heat exchanger may be disposed sequentially from an upper side to a lower side. Accordingly, then, the combustion gas may flow to a lower side. However, a direction thereof is not limited thereto.

The heat exchanging device 22 may include a heat exchanging housing, and the sensible heat exchanger and the latent heat exchanger may be disposed in an interior thereof. The tubes of the heat exchangers may exchange heat with the water while the combustion gas passes through a space located in an interior of the heat exchanging housing.

Assume that a cross-section in a section obtained by cutting the interior space of the heat exchanging housing by a plane that is perpendicular to the flow direction of the combustion gas is a reference cross-section. The heat exchanging housing may include a tapered area, in which the reference cross-section decreases along the flow direction of the combustion gas, and a section, in which the reference cross-section is not decreased. With respect to the flow direction of the combustion gas, the reference cross-section at a downstream side distal end of the heat exchanging housing may be smaller than the reference cross-section at an upstream side distal end thereof. With respect to the flow direction of the combustion gas, the reference cross-section at an upstream side distal end of the latent heat exchanger may be smaller than the reference cross-section at a downstream side distal end of the sensible heat exchanger. Accordingly, a degree, by which a flow velocity of the combustion gas is decreased when the combustion gas flows from the sensible heat exchanger to the latent heat exchanger, may be decreased as compared with a case, in which the reference cross-section is maintained, and condensate located between the pin and the pin or between the tube and the tube may be pushed out. Accordingly, a structure of the heat exchanging housing may prevent a flow stay of the combustion gas from occurring in the latent heat exchanger to reduce thermal efficiency. The pins of the heat exchangers may be formed in correspondence to a shape of the interior space of the above-described heat exchanging housing.

The heat exchanging housing may include left and right side surfaces and a passage cap plate that covers the left and right side surfaces. The passage cap plate is a plate including a passage cap that forms an interior space together with the left and right side surfaces as the left and right side surfaces of the heat exchanging housing, through which the tube passes, are covered. The plurality of passage caps and the tubes are communicated with each other to form passages, through which the water flows in the heat exchanging device 22. The passages formed in the heat exchanging device by the plurality of passage caps and the tubes may include a parallel section and a series section.

The water heater 20 may include a condensate receiver disposed on the downstream side of the latent heat exchanger along the flow direction of the combustion gas. When the condensate generated in the latent heat exchanger drops to a vertically lower side due to the self-weight, the condensate receiver may collect the condensate. The condensate receiver may have an inner surface that is inclined toward a condensate outlet extending to the vertically lower side such that the collected condensate is discharged through the condensate outlet. A condensate trap may be disposed in the condensate outlet such that the combustion gas is discharged through the condensate outlet and the condensate is discharged therethrough. The condensate trap may be a ball type trap, and a counteragent may be embedded in the condensate trap to neutralize and discharge the condensate. The condensate outlet may be exposed to an outside of the case 10.

Furthermore, the water heater 20 may include an exhaust duct such that the residual combustion gas is discharged at the same time when the condensate is discharged. The exhaust duct may be formed to be communicated with the condensate receiver. The exhaust duct extends to the vertically upper side to discharge the residual combustion gas to the outside.

An air supply hole 23 for supplying exterior air to the water heater 20 may pass through an upper wall 11 of the case 10. The air introduced through the air supply hole 23 may be provided to the burner 21 of the water heater 20. The combustion gas generated through the combustion reaction of the water heater 20 may be delivered to a gas outlet 24 that passes through the upper wall 11 of the case 10 via the exhaust duct, and may be discharged to the outside. Because the combustion gas is located only in the water heater 20 and is discharged through the gas outlet, there is no concern of the combustion gas being mixed with the air supplied to the rooms.

A fuel port for providing the fuel to the air heating apparatus 1 may be disposed to pass through a right side wall 14 of the case 10. The fuel port may be connected to the burner 21 by a medium of a venturi 26. The venturi 26 may be a dual venturi 26 that is bifurcated to two sides and provides the fuel to the burner 21. The fuel port and the venturi 26 may be connected to each other by a medium of a fuel valve 25. As the fuel valve 25 is selectively opened and closed, it may be determined whether the fuel is supplied to the burner 21. The fuel valve 25 may be electrically connected to the processor "P".

Main Passage 90 and Pump 50

The main passage 90 means a passage, in which the water heater 20 and the heating heat exchanger 30 are disposed, and through which the water flows while circulating. In the first embodiment of the present disclosure, the passage means a path, in which a fluid flows as inner parts of the constituent elements, through which the fluid flows, are connected to each other by pipes or hoses, in which the fluid may flow through interiors thereof. Accordingly, in the case of the main passage 90, an illustrated pipe type main passage forming part 91 may connect the constituent elements. The main passage 90 may be a circulation passage, in which the water circulates.

The air heating apparatus 1 according to the first embodiment of the present disclosure may further include the pump 50. The pump 50 may be disposed in the main passage 90 to pump the water. Accordingly, the pump 50 may press the water flowing along the main passage 90 such that the water circulates along a specific circulation direction D1.

The pump 50 may be electrically connected to the processor "P". The pump 50 may be a general pump that is operated according to an on/off state of a power source, and may be a pump of a kind that may control a flow rate of water. Accordingly, the processor "P" may control the pump 50 to change a flow rate of the water flowing along the main passage 90.

A sequence, in which the water flows in the main passage 90 along the circulation direction D1, will be described, starting from the heat exchanging device 22, as follows. The water in the main passage 90 is delivered to the heat exchanging device 22. The water may be introduced first to the latent heat exchanger of the heat exchanging device 22, and the water receives the latent heat generated in the condensation process to be heated while condensing vapor of the combustion gas that flows around the latent heat exchanger. The water heated in the latent heat exchanger may be delivered to the sensible heat exchanger and may be heated in a scheme, in which the water receives the heat generated through the combustion reaction. The water heated in the heat exchanging device 22 may be delivered to the heating heat exchanger 30. The water delivered to the heating heat exchanger 30 may deliver the heat to the air that has passed through the heating heat exchanger 30 to be cooled. The cooled water may return to the heat exchanging device 22 via the expansion tank 60 through the main passage 90 again. In the circulation process, the water may pass through the pump 50, a flow rate control valve 81, and various acquisition devices.

Heating Heat Exchanger 30 and Fan 40

Figure 7:
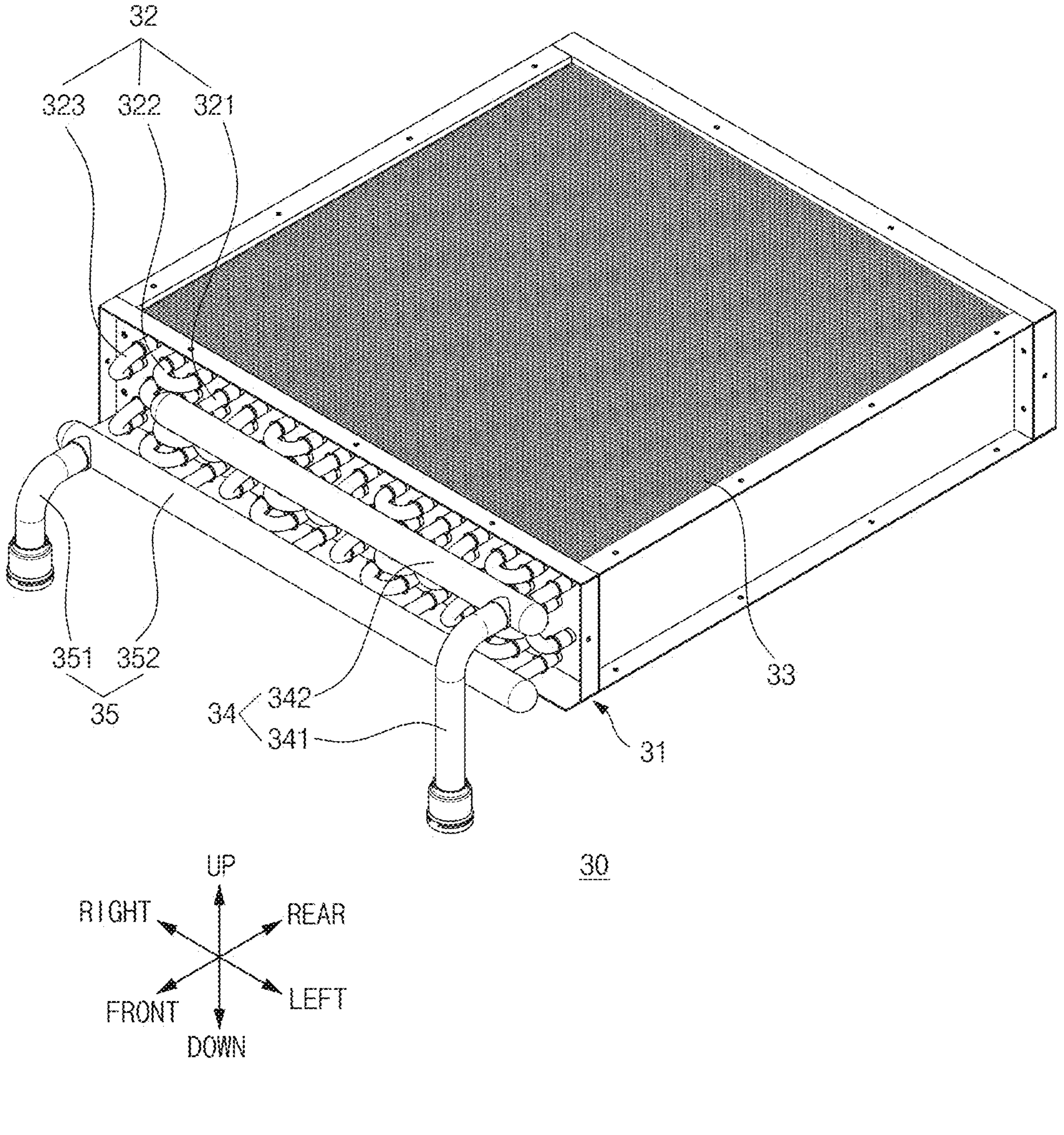
FIG. 7 is a perspective view illustrating a heating heat exchanger of the air heating apparatus according to the first embodiment of the present disclosure.

FIG. 7 is a perspective view illustrating the heating heat exchanger 30 of the air heating apparatus 1 according to the first embodiment of the present disclosure.

The heating heat exchanger 30 is a constituent element configured to exchange heat between the water and the air. The heating heat exchanger 30 may be configured to receive the water and exchange heat between the water and the air that is to be discharged for heating.

The heating heat exchanger 30 may be disposed adjacent to the upper wall 11 of the case 10. An opening may be formed in the upper wall 11 of the case 10, and may discharge the air that has passed through the heating heat exchanger 30. The opening formed in the upper wall 11 of the case 10 may be connected to the duct 3 to deliver the heated air to the rooms.

The heating heat exchanger 30 may include heat exchange tubes 32, through which the water heated by the water heater 20 flows. The heat exchange tube 32 may be of a pipe type such that the water flows through an interior thereof and the air blown by the fan 40 flows through an outside, and may form a passage that is winding in the forward/rearward direction and the leftward/rightward direction. The heat exchange tubes 32 may be formed of a material including aluminum and copper, and may be formed of a material including SUS that is a stainless steel.

Because the heat exchange tubes 32 are formed of the above-described material and are configured such that the water flows through interiors thereof, the following effects may be expected. Unlike a pipeline of a conventional gas furnace that causes cracks and leak combustion gas while experiencing thermal expansion and contraction as the combustion gas and air flow to an inside and an outside, a danger of causing a crack may be reduced and the combustion gas is not leaked in the air but the water is leaked even when a crack is caused, whereby safety may be remarkably reinforced. Furthermore, in the heating heat exchanger 30 of the present disclosure, because the heat of the water and the air are exchanged through the heat exchange tubes 32, humidity may be maintained and the air is heated, whereby a separate humidity adjusting device is not required.

The heat exchange tubes 32 may constitute a plurality of layers disposed at different locations along the upward/downward direction. Although it is illustrated and described that the heat exchange tubes 32 form four layers in the first embodiment of the present disclosure, the number of the layers is not limited thereto. Furthermore, the heat exchange tubes 32 form the four layers and all the four layers may be connected to each other in series, but the layers may be formed in a form, in which series connections and parallel connections are combined.

The heat exchange tubes 32 may include linear members 321 that extend in the forward/rearward direction, and connection members that connect distal ends of the linear members 321 that are adjacent. The connection members may include connection members 322 for the same layer, and connection members 323 for different layers. The plurality of linear members 321 are arranged along the leftward/rightward direction, and the plurality of connection members 322 for the same layer are disposed at front and rear ends of the linear members 321 to connect the distal ends of the linear members 321 that are adjacent, whereby passages are formed. The plurality of connection members 323 for different layers may form passages by connecting the distal ends of the linear members 321 located in the adjacent layers. The connection members may have a "U" shape.

The heating heat exchanger 30 may further include a distribution pipe 34 that is configured to receive the water from the water heater 20 and distribute the water to the layers constituted by the heat exchange tubes 32. The distribution pipe 34 may include a distribution delivery pipe 341 and a distribution head 342. The distribution delivery pipe 341 may be connected to the heat exchanging device 22 to receive the heated water, and the water flows in the distribution head 342 connected to the distribution delivery pipe 341. The distribution head 342 may extend in the leftward/rightward reaction, and may be connected to the plurality of linear members 321. Accordingly, by the distribution head 342, a parallel passage including a plurality of partial passage, inlets and outlets of which are common, may be formed. Here, the inlet of the parallel passage may be the distribution head 342. The entire passage formed by the heat exchange tubes 32 may include a section constituted by the above-described parallel passage.

Then, the linear members 321, to which the distribution head 342 is connected, may be the linear members 321 located on an uppermost layer of the layers formed by the heat exchange tubes 32. The water is delivered to the uppermost layer of the heat exchange tubes 32, and the water flows to the lowermost layer along the layers formed by the heat exchange tubes 32. In the process, heat may be delivered to the air that passes through a periphery of the heat exchange tube 32. That is, a direction, in which the air blown by the fan 40 flows in the heating heat exchanger 30, is an upward direction and a direction, in which the water flows as a whole, is a downward direction that is opposite thereto, whereby a counter-flow structure may be provided.

The heating heat exchanger 30 may further include a collection pipe 35 that returns the water that has finished delivering heat to the air to the water heater 20. The collection pipe 35 may include a collection delivery pipe 351 and a collection head 352. The heat exchange tubes 32 are connected to the collection head 352, and the cooled water is delivered to the collection head 352. The collection head 352 may be connected to the collection delivery pipe 351, and may deliver the cooled water to the heat exchanging device 22 connected to the collection delivery pipe 351. The collection head 352 may extend in the leftward/rightward direction, and may be connected to the plurality of linear members 321. Accordingly, the collection head 352 may be an outlet of the parallel passage, and the parallel passage may terminate at the collection head 352, whereby the water may gather in the collection head 352. Then, the linear members 321, to which the collection head 352 is connected, may be the linear members 321 located on a lowermost layer of the layers formed by the heat exchange tubes 32.

The heating heat exchanger 30 may cross the heat exchange tubes 32, and may have a plurality of heat transfer fins 33 that are passed through by the heat exchange tubes 32. The heat transfer fins 33 may be formed to have a plate shape that is perpendicular to the forward/rearward direction and may be arranged in the forward/rearward direction, and may transfer the heat of the water flowing inside the heat exchange tube 32 to the surrounding air better. The air may pass between the heat exchange tube 32 and the heat transfer fins 33 along an upward direction. The heat transfer fins 33 and the heat exchange tubes 32 may be fixed by a heating heat exchanging housing 31. The heat transfer fins 33 may be disposed in the heating heat exchanging housing 31. The heating heat exchanging housing 31 may be fixed to the case.

The air heating apparatus 1 according to the first embodiment of the present disclosure may further include the fan 40. The fan 40 is configured to blow the air to the heating heat exchanger 30. The fan 40 may be disposed on a lower side of the heating heat exchanger 30 such that the air is blown to an upper side to pass through the heating heat exchanger 30, and may be disposed such that an outlet of the heating heat exchanger 30, from which the air is discharged, faces the upper side. The fan 40 may include constituent elements such as a motor and wings, and may be electrically connected to the processor "P". Accordingly, the fan 40 is electrically controlled to be operated, and thus the air may be blown as the motor rotates the wings. The fan 40 may include an impeller to blow the air.

An air blowing space 100 that is an empty space may be formed between the fan 40 and the heating heat exchanger 30 in an interior space of the case 10.

A process of circulating the air will be described, starting from the fan 40, as follows. The air introduced to the fan 40 may be blown to an upper side. The blown air passes through the heating heat exchanger 30. While passing through the heating heat exchanger 30, the air may receive the heat from the water that passes via the heating heat exchanger 30 to be heated. The heated air may be discharged to the outside of the case 10, and may be sent to the rooms of the house "H" through the ducts 3. The air sent to the rooms or the cooled air introduced into the interior of the house "H" from the outside may be introduced into the interior of the case 10 again to be introduced through the inlet of the fan 40.

Various Acquisition Devices and Valves.

Figure 8:
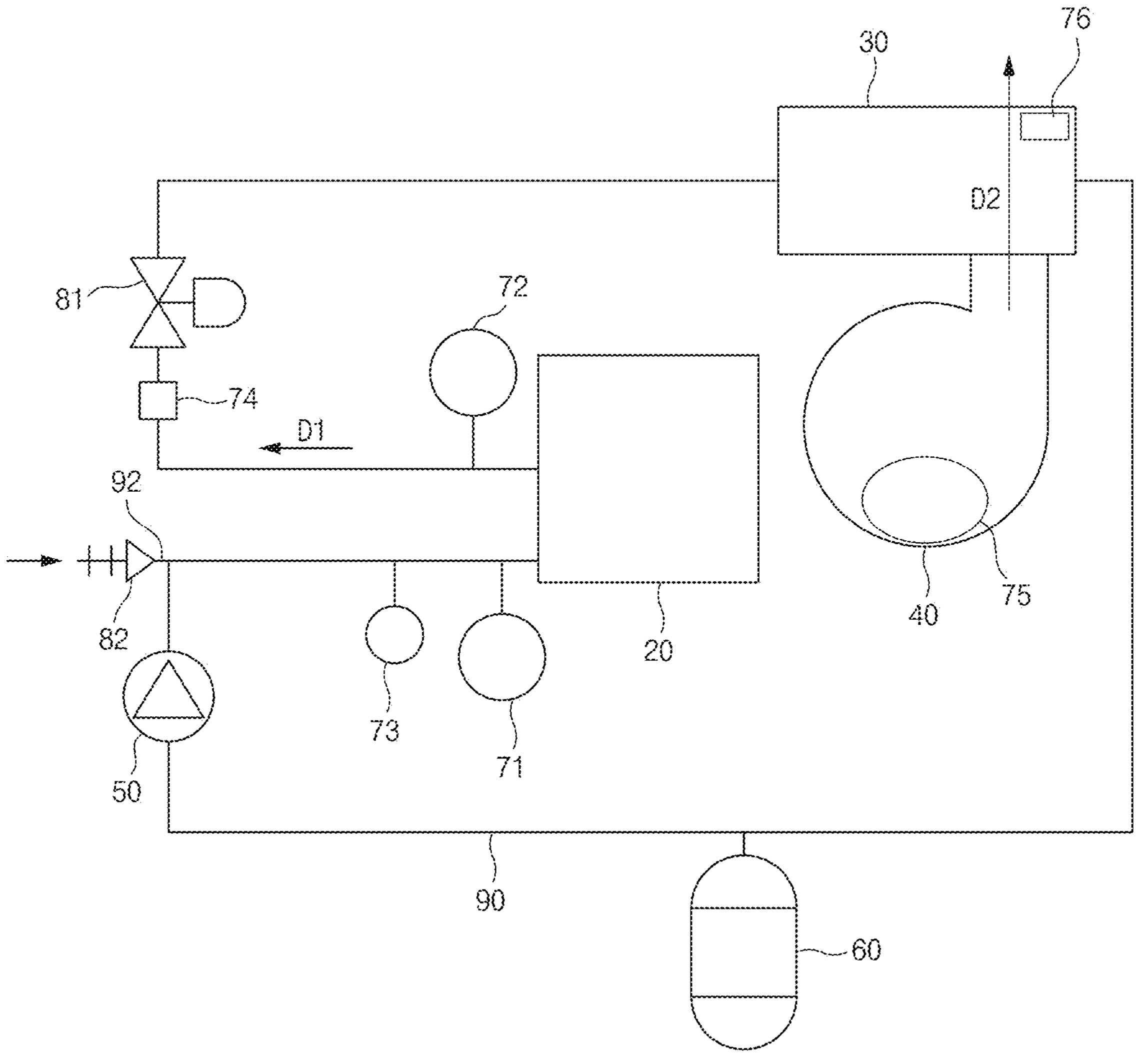
FIG. 8 is a view conceptually illustrating the air heating apparatus according to the first embodiment of the present disclosure.

FIG. 8 is a view conceptually illustrating the air heating apparatus 1 according to the first embodiment of the present disclosure.

The air heating apparatus 1 according to the first embodiment of the present disclosure may further include a water temperature acquiring device 71. The water temperature acquiring device 71 may be electrically connected to the processor "P". The water temperature acquiring device 71 may be disposed in the main passage 90 to acquire a temperature of the returning water.

The air heating apparatus 1 according to the first embodiment of the present disclosure may further include an exiting water temperature acquiring device 72. The exiting water temperature acquiring device 72 may be electrically connected to the processor "P". The exiting water temperature acquiring device 72 may be disposed in the main passage 90 to acquire a temperature of the water heated in the water heater 20 to be discharged. The water temperature acquiring device 71 may be disposed on an upstream side of the water heater 20 and a downstream side of the heating heat exchanger 30 with respect to the circulation direction D1, and the exiting water temperature acquiring device 72 may be disposed on a downstream side of the water heater 20 and an upstream side of the heating heat exchanger 30.

The air heating apparatus 1 according to the first embodiment of the present disclosure may further include an air temperature acquiring device. The air temperature acquiring device may be electrically connected to the processor "P". The air temperature acquiring device may include a returning air temperature acquiring device 75 that acquires a temperature of the returning air, and a discharged air temperature acquiring device 76 that acquires a temperature of the air that exchanges heat in the heating heat exchanger 30 and is discharged. The returning air temperature acquiring device 75 may be disposed at an inlet of the fan 40, which is a part in which the air returned to the fan 40, such that the temperature of the returning air is acquired. The discharged air temperature acquiring device 76 may be disposed at an outlet end of the heating heat exchanger 30 with respect to a flow direction D2 of the air such that the temperature of the air that has exchanged heat and discharged is acquired. Here, the flow direction D2 of the air may be an upward direction.

The water temperature acquiring device 71, the exiting water temperature acquiring device 72, and the air temperature acquiring device may be thermocouples or thermistors for acquiring temperatures, and the kinds thereof are not limited thereto. The water temperature acquiring device 71, the exiting water temperature acquiring device 72, and the air temperature acquiring device may deliver the acquired temperatures to the processor "P" in forms of electric signals.

The air heating apparatus 1 according to the first embodiment of the present disclosure may further include a flow rate acquiring device 74. The flow rate acquiring device 74 may be electrically connected to the processor "P". The flow rate acquiring device 74 may be disposed in the main passage 90 such that a flow rate of the water flowing through the main passage 90 is acquired.

The air heating apparatus 1 according to the first embodiment of the present disclosure may further include the flow rate control valve 81. The flow rate control valve 81 may be electrically connected to the processor "P" to be controlled. An opening of the flow rate control valve 81 may be adjusted such that the flow rate of the water flowing along the main passage 90 is adjusted. As the opening degree is adjusted, a cross-section of the main passage 90 is changed, and thus the flow rate may be adjusted. For example, when the opening of the flow rate control valve 81 is decreased and thus the cross-section of the main passage is decreased, the flow rate may be decreased. The flow rate control valve 81, as illustrated, may be disposed on a downstream side of the water heater 20 and an upstream side of the heating heat exchanger 30 with respect to the circulation direction D1, but a location thereof is not limited thereto.

The air heating apparatus 1 according to the first embodiment of the present disclosure may further include a water inlet port 92. The water inlet port 92 may be communicated with the main passage 90 to supplement water in the main passage 90. Accordingly, the water inlet port 92 may be a passage, through which the water may be supplemented in the main passage 90 that forms the closed circuit. The water inlet port 92 may be connected to one site of the main passage 90 that is on an upstream side of the water heater 20 and a downstream side of the heating heat exchanger 30 with respect to the circulation direction D1 such that direct water or the like may merged to the returning water, but the location thereof is not limited thereto.

The air heating apparatus 1 according to the first embodiment of the present disclosure may further include a pressure acquiring device 73. The pressure acquiring device 73 may be connected to the main passage 90 to acquire a pressure in the interior of the main passage 90. The pressure acquiring device 73 may be electrically connected to the processor "P".

The pressure acquiring device 73 may be a monometer or an elastic gauge for acquiring a pressure, but the kind thereof is not limited thereto. The pressure acquiring device 73 may deliver the acquired pressure to the processor "P" in a form of an electric signal.

The air heating apparatus 1 according to the first embodiment of the present disclosure may further include a water supplementing valve 82. The water supplementing valve 82 may be opened and closed based on the pressure acquired by the pressure acquiring device 73. Accordingly, the water supplementing valve 82 may be electrically connected to the processor "P". The processor "P" that has received the pressure acquired by the pressure acquiring device 73 may control the water supplementing valve 82 based on the acquired pressure. As the water supplementing valve 82 is controlled, it may be determined whether the water introduced through the water inlet port 92 is to be supplemented in the main passage 90. For the operation, the water supplementing valve 82 may be disposed in the water inlet port 92. In detail, when the pressure acquired by the pressure acquiring device 73 is a reference pressure or less, the water supplementing valve 82 may be opened such that the water introduced into the water inlet port 92 is introduced into the main passage 90, and when the acquired pressure is more than the reference pressure, the water supplementing valve 82 may be closed such that the water introduced into the water inlet port 92 is not introduced into the main passage 90.

Because the various acquisition devices and valves, which have been described above, are disposed in the main passage 90, they may be embedded in the case 10.

Processor "P"

The processor "P" is configured to control a temperature of the water that passes through the heating heat exchanger 30 via the main passage 90 and returns to the water heater 20. The processor "P" is a constituent element including an element that may perform logical operations for performing a control command, and may include a central processing unit (CPU). The processor "P" may be connected to the elements to transmit signals according to the control commands to the element for controls, and may be connected to the sensors and the acquirers to receive the acquired information in a form of signals. Accordingly, in the first embodiment of the present disclosure, the processor "P" may be electrically connected to the various constituent elements included in the air heating apparatus 1. Because the processor "P" may be electrically connected to the elements, it may be connected to the elements by wire or may further include a communication module that may perform communication wirelessly for mutual communications.

Because the processor "P" is electrically connected to the respective constituent elements of the integral air heating apparatus 1 according to the first embodiment of the present disclosure to perform operations by using the delivered information and deliver a control signal, the respective constituent elements may be controlled in an optimum state and the respective constituent elements may be operated while automatically interworking with each other. Furthermore, because information or control data that are acquired from the water and the air that circulate, as will be described later, are acquired in real time and are controlled in an integrated way due to the integrated interworking control of the processor "P", efficiency may be uniformly maintained, and optimum setting that is suitable for the entire system may be automatically made.

The air heating apparatus 1 may further include a storage medium, and control commands performed by the processor "P" may be stored in the storage medium to be utilized. The storage medium may be a device such as a hard disk drive (HDD), a solid state drive (SSD), a server, a volatile medium, or a nonvolatile medium, but the kinds thereof are not limited thereto. In addition, the storage medium may further store data that is necessary to allow the processor "P" to perform an operation.

The processor "P" may be disposed in a lower area of an interior space of the case 10. The processor "P" may be disposed adjacent to the front side wall 12 of the case 10. Accordingly, when a control part including a display or a button, which may be manipulated by a user, is disposed in the front side wall 12 of the case 10, the control part and the processor "P" may be easily electrically connected to each other.

The processor "P" may control a temperature of the returning water by controlling the flow rate of the water that flows in the main passage 90. Accordingly, the processor "P" may control the flow rate of the water that flows in the main passage 90 by controlling the flow rate control valve 81 or by controlling the pump 50, and as a result, may control the temperature of the returning water. When the flow rate control valve 81 or the pump 50 is controlled such that the flow rate of the water that flows in the main passage 90 is decreased, the water flows in the heating heat exchanger 30 for a longer period of time as compared with the other cases whereby a higher calorie may be delivered to the air and thus the temperature of the returning water will be decreased. To the contrary, when the flow rate control valve 81 or the pump 50 is controlled such that the flow rate that flows in the main passage 90 is increased, the temperature of the returning water will be increased as compared with the other cases.

The processor "P" may not only adjust the flow rate by controlling the flow rate control valve 81 and the pump 50 but also be electrically connected to the burner 21 to control the burner 21 so as to adjust the calorie delivered to the water. The burner 21 may include a blower that blows the air such that the fuel and the air are mixed to be used for combustion, and the processor "P" may adjust the flow rate of the air provided to a part, in which flames are generated, by adjusting a rotational speed of the blower. As the flow rate of the air is adjusted, the calorie generated in the water heater 20 through the combustion reaction may be adjusted. Accordingly, because the air heating apparatus 1 according to the first embodiment of the present disclosure may have a high turn-down ratio of 6:1 to 10:1, it may be expected that a constant efficiency may be maintained by adjusting the calorie or the flow rate of the water properly in correspondence to operation situations, such as a low-load operation or a high-load operation, which has different loads.

The processor "P" may control the flow rate of the water based on a preset water temperature and an acquisition water temperature that is a water temperature acquired by the water temperature acquiring device 71. The processor "P" may control such that the temperature of the water that returns to the water heater 20 is lower than or equal to the preset water temperature. Accordingly, the processor "P" may control the flow rate control valve 81 or the pump 50 such that the flow rate of the water is decreased when the acquisition water temperature is higher than the preset water temperature.

The preset water temperature may be a water temperature that is lower than the highest water temperature of the water that may return to the latent heat exchanger when the combustion gas passes through the latent heat exchanger and is condensed. In other words, the preset water temperature may be lower than the maximum water temperature of the water that returns to the latent heat exchanger, by which the combustion gas may be condensed in the latent heat exchanger. That is, when the water of the same temperature as the preset water temperature is introduced into the latent heat exchanger, the combustion gas may be condensed in the latent heat exchanger.

The processor "P" may include a mapping table. The mapping table is a table, in which a temperature of the returning air, a calorie provided to the water and a flow rate of the water when the temperature of the air is acquired correspond to each other, when the air heating apparatus 1 according to the first embodiment of the present disclosure is used. By using the mapping table, the calorie and the flow rate of the water may be estimated without directly acquiring the calorie and the flow rate of the currently provided water from the temperature acquired by the air temperature acquiring device. The mapping table may further include information, in which the calorie and the flow rate of the water correspond to the temperature of the returning water or the temperatures of the returning air and the returning water correspond to each other. Accordingly, by using the mapping table, the temperature of the returning water may be estimated from the temperature of the returning air. The temperature of the returning air may be acquired by the above-described returning air temperature acquiring device 75, and may be delivered to the processor "P".

By using the mapping table, the processor "P" may control the flow rate of the water and the calorie provided by the burner 21 based on the acquired air temperature and the preset air temperature. The preset air temperature may be a temperature of the returning air, which is acquired when the temperature of the water is the same as the preset water temperature. When the acquired air temperature and the preset air temperature are different, the processor "P" may control the burner 21, the flow rate control valve 81, or the pump 50 such that the returning water has the calorie and the flow rate corresponding to the preset air temperature on the mapping table. Furthermore, the processor "P" may estimate the temperature of the water that returns through the above-described process from the acquired air temperature, and may carry out the above-described control of the flow rate by recognizing whether the estimated water temperature is lower than or equal to the preset water temperature.

In this way, when the processor "P" carries out the control by using the temperature of the returning air, the processor "P" may calculate the calories provided to the air by the water by using the temperatures of the water, which are acquired by the water temperature acquiring device 71 and the exiting water temperature acquiring device 72 and the flow rate acquired by the flow rate acquiring device 74 to use the calories for the control.

Figure 9:
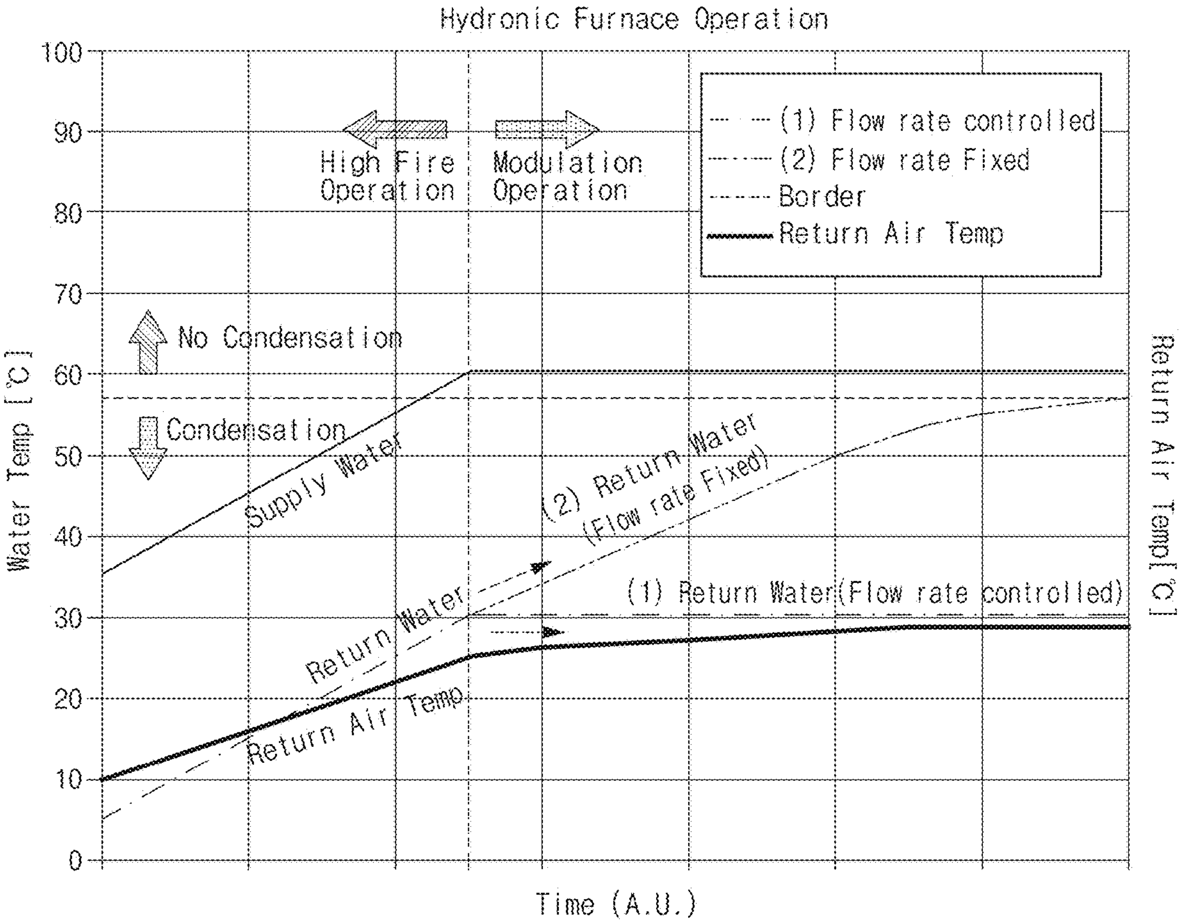
FIG. 9 is a graph depicting times and various temperatures, which may be identified, when the air heating apparatus according to the first embodiment of the present disclosure is used, on a transverse axis and a longitudinal axis.
Figure 10:
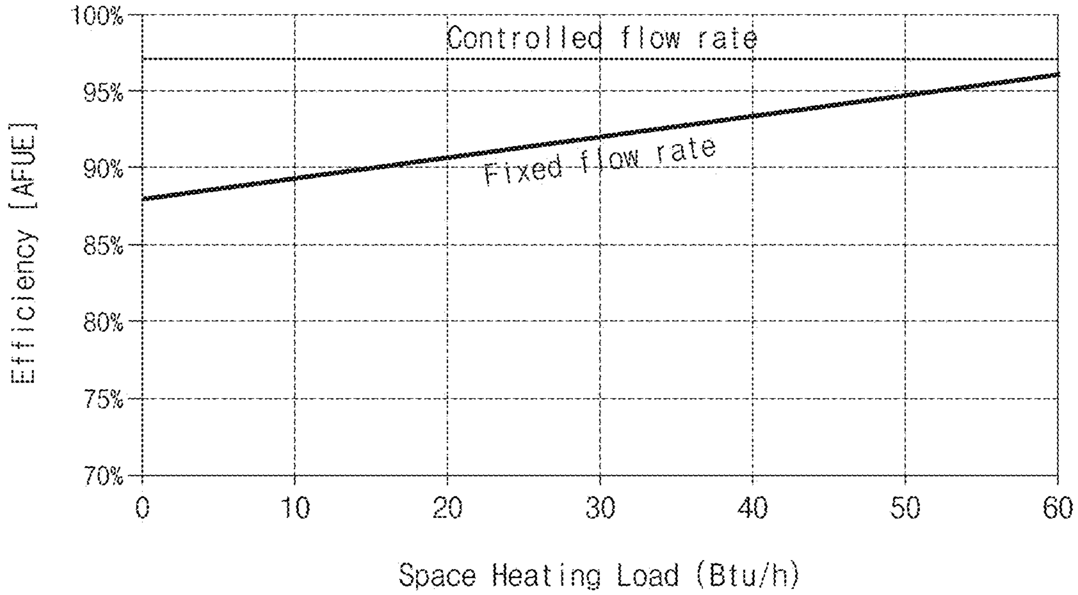
FIG. 10 is a graph depicting heating loads and efficiencies, which may be identified, when the air heating apparatus according to the first embodiment of the present disclosure is used, on a transverse axis and a longitudinal axis.

FIG. 9 is a graph depicting times and various temperatures, which may be identified, when the air heating apparatus 1 according to the first embodiment of the present disclosure is used, on a transverse axis and a longitudinal axis. FIG. 10 is a graph depicting heating loads and efficiencies, which may be identified, when the air heating apparatus 1 according to the first embodiment of the present disclosure is used, on a transverse axis and a longitudinal axis.

In FIG. 9, various temperatures that may be identified when the air heating apparatus 1 according to the first embodiment of the present disclosure is used are expressed on the longitudinal axis in unit of Celsius degrees, and times are expressed on the transverse axis in an arbitrary unit. The temperatures of the water that exits from the water heater 20 are expressed by a thin solid line in FIG. 9. The temperatures of the water that returns to the water heater 20 are expressed by an alternate long and short dash line and an alternate long and two short dash line. Among them, the alternate long and two short dash line indicates a change of a temperature of the water in a general case, in which the flow rate is not adjusted unlike the first embodiment of the present disclosure, and the alternate long and short dash line indicates a change of a temperature of the water when the flow rate is adjusted by the processor "P" of the first embodiment of the present disclosure. The temperatures of the returning air are expressed by a thick solid line in FIG. 9.

With respect to a transverse dashed line, an upper side of the graph indicates a temperature range, in which condensation cannot occur, and a lower side of the graph indicates a temperature range, in which condensation may occur. With respect to a longitudinal dashed line, a left side of the graph indicates a high-calorie operation area, in which a high calorie may be delivered to the water by the water heater 20, and a right side of the graph indicates a low-calorie operation area, in which a relatively low calorie may be delivered to the water. An operation may be performed in the high-calorie operation area at an initial stage, at which the air heating apparatus 1 according to the first embodiment of the present disclosure starts an operation thereof, and an operation may be performed in the low-calorie operation area as temperature is saturated after a specific period of time elapses. In the low-calorie operation area, a necessary heating load is low, and in the high-calorie operation area, the necessary heating load is high.

Referring to the drawings, it may be identified that the combustion gas is not condensed in the latent heat exchanger when the returning water has a temperature of 50 to 60° C. Accordingly, in this case, the returning water is hardly heated in the latent heat exchanger, and is heated only by the sensible heat exchanger. Because there is a limit in the temperature of the combustion gas that passes through the sensible heat exchanger and the convection heat generated by the combustion reaction, there may be a limit in the temperature of the water after the water is heated by the water heater 20. Accordingly, when the flow rate is not adjusted in spite that time sufficiently elapses after the air heating apparatus 1 is operated and the low-calorie operation area is reached, the temperature of the returning water continues to increase as indicated by the alternate long and two short dash line, and a very low thermal efficiency is shown as may be identified from the thick solid line of FIG. 10.

Meanwhile, when a temperature of the returning water is set to be lower than or equal to the preset water temperature as indicated by the long and short dash line by properly controlling the flow rate as in the first embodiment of the present disclosure, a high thermal efficiency may be uniformly maintained as may be identified from the thin solid line of FIG. 10. It has been described that the preset water temperature is 30° C. in the graph, but the value is not limited thereto. Here, the heating load is indicated by BTU/h, and the efficiency is indicated by percentage. The efficiency may be obtained by subtracting the heat dissipation loss and the exhaust loss from 100% and adding an efficiency increment due to the condensation latent heat.

Furthermore, when the temperature of the returning water is sufficiently low, the sensible heat exchanger also may deliver a sufficiently high calorie to the water by the combustion gas, whereby the temperature of the combustion gas discharged finally may become lower and overheating of the air heating system 1 may be prevented.

Figure 11:
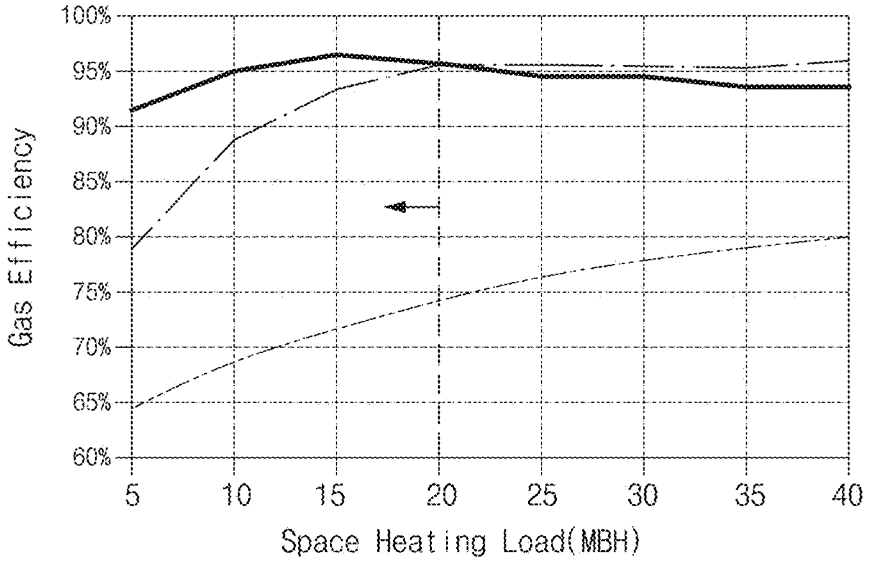
FIG. 11 is a graph depicting heating loads and efficiencies, which may be identified, when the air heating apparatus according to the first embodiment of the present disclosure and an exemplary system for heating air are used, on a transverse axis and a longitudinal axis.

FIG. 11 is a graph depicting heating loads and efficiencies, which may be identified, when the air heating apparatus 1 according to the first embodiment of the present disclosure and an exemplary system for heating air are used, on a transverse axis and a longitudinal axis. Here, the heating load is indicated by MBH and the efficiency is indicated by percentage, and the efficiency may be obtained by subtracting the heat dissipation loss and the exhaust loss from 100% and adding an efficiency increment due to the condensation latent heat.

The materials indicated by the solid line in the drawing indicate a value that may be obtained when the air heating apparatus 1 according to the first embodiment of the present disclosure is used. The materials indicated by the long and short dash line in the drawing indicate a value that may be obtained when an exemplary system for heating air by using latent heat is used. The materials indicated by the long and two short dash line in the drawing indicate a value that may be obtained when an exemplary system for heating air by using only sensible heat is used.

When the exemplary systems for heating air are used, a control method is simple and a turn down ratio is very low, whereby it may be seen that a very low efficiency is shown in the low-load area as illustrated. This is because the exemplary systems have to continuously repeat performance or the combustion reaction and stop of the combustion reaction for a short period in the low-load area. However, when the air heating apparatus 1 according to the first embodiment of the present disclosure is used, the following effects may be expected. It may be identified that combustion and heating are performed continuously without abruptly starting or stopping the combustion reaction by performing the operations that are suitable for the load situations in a scheme, in which a turn down ratio of the air heating apparatus 1 is high and the flow rate or the calorie of the water is adjusted. Furthermore, because the over-operation does not occur, operation noise may be reduced.

Furthermore, when the air heating apparatus 1 according to the first embodiment of the present disclosure is used, the heat exchange tubes 32 are formed of the above-described material and are configured such that the water flows through the interiors thereof. Accordingly, unlike a pipeline of a conventional gas furnace that causes cracks and leaks combustion gas while experiencing thermal expansion and contraction as the combustion gas and air flow to an inside and an outside, a danger of causing a crack may be reduced and the combustion gas is not leaked in the air but the water is leaked even when a crack is caused, whereby safety may be remarkably reinforced.

Furthermore, in the heating heat exchanger 30 according to the first embodiment of the present disclosure, because the heat of the water and the air are exchanged through the heat exchange tubes 32, the air is heated while humidity is maintained, whereby a separate humidity adjusting device is not required.

Furthermore, the air heating apparatus 1 may be integrally formed because the constituent elements of the air heating apparatus 1 may be embedded in the interior of the case 10 according to the first embodiment of the present disclosure, and the air heating apparatus 1 does not require many installation spaces, and lengths of the constituent elements that are necessary for connections thereof become shorter whereby necessary costs, a danger of damage of the constituent elements, and heat loss may be reduced. Furthermore, the air heating apparatus 1 according to the first embodiment of the present disclosure may be directly installed in replacement of a conventional gas furnace.

Because the processor "P" according to the first embodiment of the present disclosure is electrically connected to the respective constituent elements embedded together in the case 10 of the integral air heating apparatus 1 to perform operations by using the delivered information and delivers a control signal, the respective constituent elements may be controlled in an optimum state and the respective constituent elements may be operated while automatically interworking with each other. Because information or control data that are acquired from the water and the air that circulate are acquired in real time and are controlled in an integrated way due to the integrated interworking control of the processor "P", efficiency may be uniformly maintained, and optimum setting that is suitable for the entire system may be automatically made.

Furthermore, because the main passage 90 according to the first embodiment of the present disclosure constitutes a closed circuit, except for a special case, the water is not often supplemented, whereby a defect problem of components due to scales may be hardly generated. A pressure in the interior of the main passage 90 used to heat the water and heat the air through this may be a pressure that may be sufficiently endured by the components that constitute the air heating apparatus 1, and thus a burden of consideration of pressure-resistant performance during design and introduction of the components.

Second Embodiment

Figure 12:
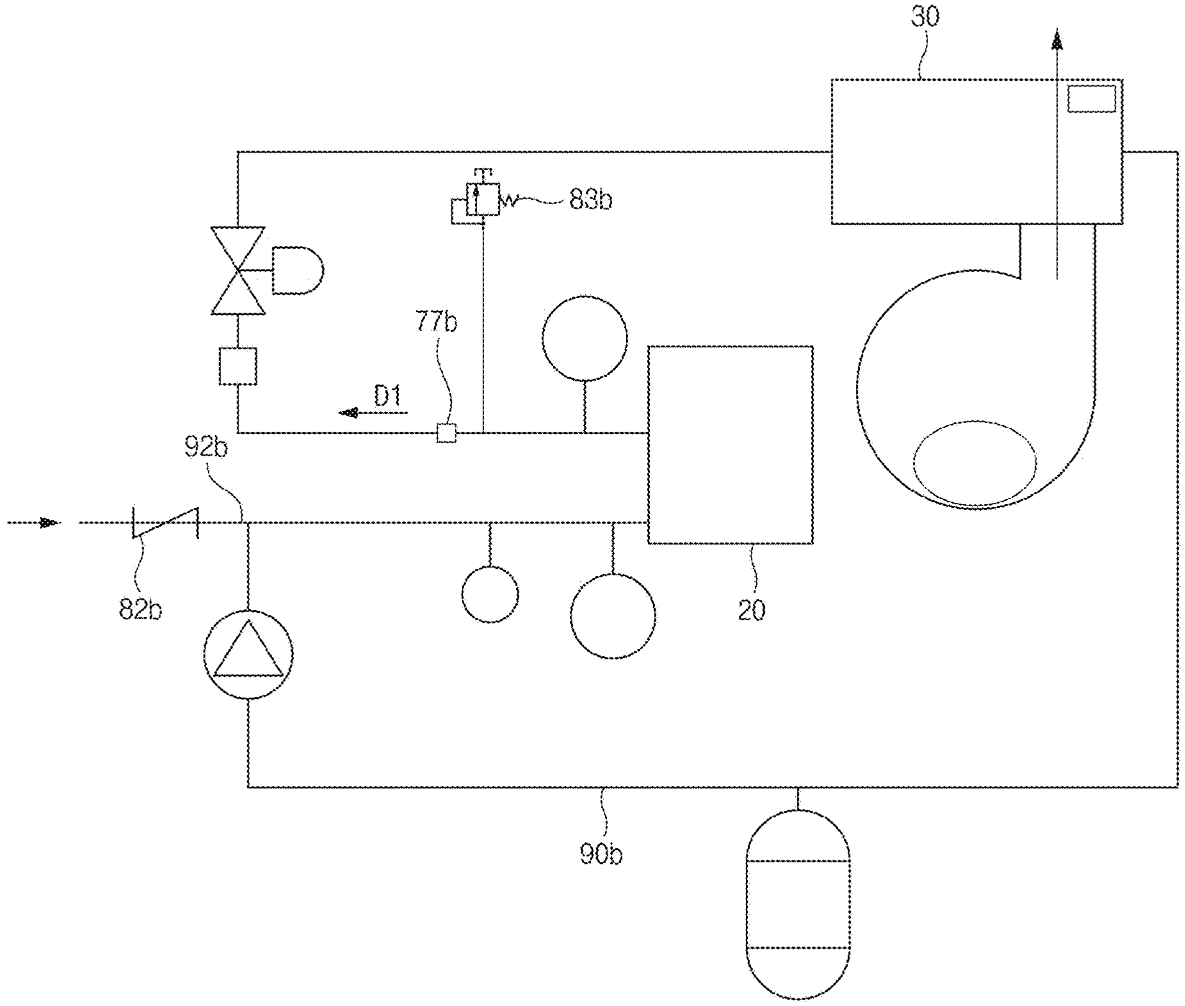
FIG. 12 is a view conceptually illustrating an air heating apparatus according to a second embodiment of the present disclosure.

FIG. 12 is a view conceptually illustrating an air heating apparatus according to a second embodiment of the present disclosure.

In the first embodiment, the main passage 90 constitutes the closed circuit, and when an abnormal pressure rise occurs, the pressure cannot be endured and the product may be damaged. The air heating apparatus according to the second embodiment of the present disclosure is different from the air heating apparatus 1 according to the first embodiment of the present disclosure in that a check valve 82*b*, a relief valve 83*b*, and a water lack determining device 77*b* are additionally disposed, and thus only the different parts will be further described, and the description of the constituent elements of the air heating apparatus 1 according to the first embodiment may be applied to the other constituent elements as they are. The water supplementing valve 82 may not be disposed in the air heating apparatus according to the second embodiment. The air heating apparatus according to the second embodiment may have the check valve 82*b*, the relief valve 83*b*, and the water lack determining device 77*b* for solving the pressure-resistant performance of the air heating apparatus and the pressure of the air heating apparatus, and thus may secure safety for a pressure vessel.

The air heating apparatus according to the second embodiment of the present disclosure may further include the check valve 82*b*. The check valve 82*b* may be disposed in a water inlet port 92*b*. The check valve 82*b* is configured such that the water is allowed to be supplemented in a main passage 90*b* through the water inlet port 92*b* and is prevented from reversely flowing from the main passage 90*b* through the water inlet port 92*b*. For the operation, the check valve 82*b* may be a general check valve, and in detail, may be a dual check valve having a vent, through which air may be discharged, but the kind thereof is not limited thereto.

The air heating apparatus according to the second embodiment of the present disclosure may further include the relief valve 83*b*. The relief valve 83*b* may be connected to the main passage 90*b*. The relief valve 83*b* may be disposed in a passage branched from the main passage 90*b* or may be disposed in an intermediate portion of the main passage 90*b*. The relief valve 83*b*, as illustrated, may be disposed between the water heater and the heating heat exchanger on the main passage 90*b*, but the location thereof is not limited thereto.

The relief valve 83*b* may be opened to discharge the air or the water in the main passage 90*b* when the pressure of the main passage 90*b* is higher than a specific threshold pressure, and thus the pressure of the main passage 90*b* may be lowered to the threshold pressure or less. Accordingly, the relief valve 83*b* may be a poppet valve to facilitate a pressure control operation and may discharge the water to the outside through a separate pipeline, but the kind thereof is not limited thereto.

The air heating apparatus according to the second embodiment of the present disclosure may further include the water lack determining device 77*b*. The water lack determining device 77*b* may be connected to the main passage 90*b*. The water lack determining device 77*b* may be disposed in a passage branched from the main passage 90*b* or may be disposed in an intermediate portion of the main passage 90*b*. The water lack determining device 77*b*, as illustrated, may be disposed between the water heater 20 and the heating heat exchanger 30 on the main passage 90*b*, but the location thereof is not limited thereto.

The water heater 20 including the heat exchanging device 22, as illustrated in FIG. 4, may be disposed on a lower side of the heating heat exchanger 30. The water lack determining device 77*b* may be disposed at an identification point that is one site between the water heater and the heating heat exchanger 30 in the main passage 90*b* to identify whether the water is full at the identification point. For the operation, the water lack determining device 77*b* may be an electronic or mechanical low-water cut-off (LWCO) device, in which a floating or contact type probe is located in the main passage 90*b* to determine whether the water is in contact therewith, but the kind thereof is not limited thereto. The water lack determining device 77*b* may be electrically connected to the processor "P". Information acquired by the water lack determining device 77*b* may be delivered to the processor "P" in a form of an electric signal, and the processor "P" may determine whether it is necessary to supplement water to the main passage 90*b* based on the delivered electric signal.

Third Embodiment

Figure 13:
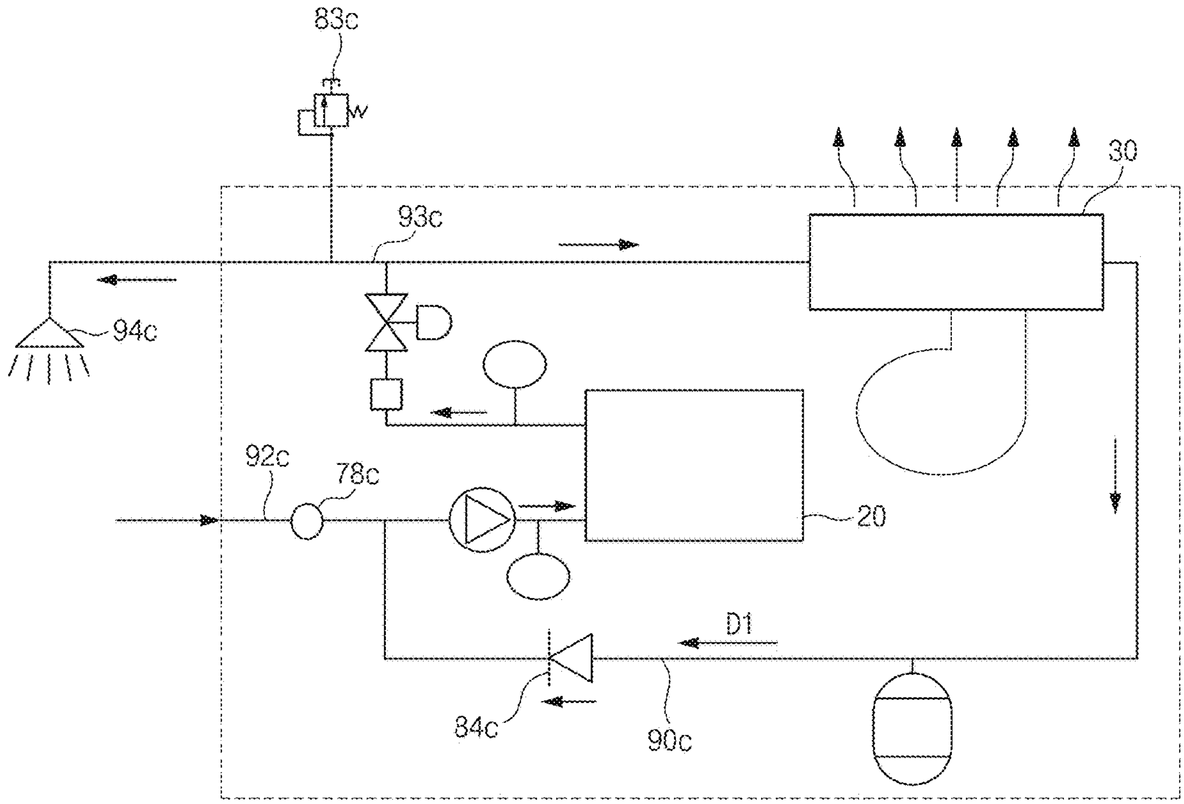
FIG. 13 is a view conceptually illustrating an air heating apparatus according to a third embodiment of the present disclosure.

FIG. 13 is a view conceptually illustrating an air heating apparatus according to a third embodiment of the present disclosure.

Various components may be used to maintain the safety of the air heating apparatus constituted by the closed circuit, as the pressure vessel. However, when the various components are used to maintain the pressure-resistant performance of the air heating apparatus, the process becomes complex and costs are increased when the air heating apparatus is produced, whereby economic efficiency is decreased.

The air heating apparatus according to the third embodiment of the present disclosure is mainly different from the air heating apparatus 1 according to the first embodiment of the present disclosure in that a hot water discharge port 93*c* additionally disposed, and thus only the different parts will be further described, and the description of the constituent elements of the air heating apparatus 1 according to the first embodiment may be applied to the other constituent elements as they are. The water supplementing valve 82 may not be disposed in the air heating apparatus according to the third embodiment.

The air heating apparatus according to the third embodiment of the present disclosure may further include the hot water discharge port 93*c*. Through the hot water discharge port 93*c*, the water heated by the heat exchanging device 22 may be discharged to the outside of a main passage 90*c*. The hot water discharge port 93*c* may be branched from a site between the water heater 20 and the heating heat exchanger 30 in the main passage 90*c*, and may function to discharge a portion of the water heated by the water heater 20 to the outside. A distal end of the hot water discharge port 93*c* may be coupled to a faucet or a shower head that is a discharge device 94*c* that supplies the heated hot water to a source of demand.

As the hot water discharge port 93*c* is disposed, the main passage 90*c* may be not a closed circuit but an open circuit. Accordingly, it may be determined that the constituent elements of the air heating apparatus according to the third embodiment are not pressure vessels, and thus the air heating apparatus according to the third embodiment may be stably operated even though the constituent elements that may maintain the pressure-resistant performance or solve the pressure are not included. Accordingly, economic efficiency may be secured in manufacturing the air heating apparatus. Furthermore, because the hot water discharge port 93*c* is present, the air heating apparatus may further perform a function of a water heater as well as a function of a heating device.

A relief valve 83*c* may be disposed in the hot water discharge port 93*c*. The relief valve 83*c* may be opened such that the pressure of the main passage 90*c* is lowered to a threshold pressure or less when the pressure of the main passage 90*c* is higher than the threshold pressure. The relief valve 83*c* may be a poppet valve for the operation, but the kind thereof is not limited thereto.

An introduced water flow rate acquiring device 78*c* may be disposed in a water inlet port 92*c* communicated with the main passage 90*c*. The water may be introduced into the main passage 90*c* from a water source through the water inlet port 92*c*, and the water introduced through the water inlet port 92*c* may be direct water. The introduced water flow rate acquiring device 78*c* is configured to acquire the flow rate of the water provided to the main passage 90*c* through the water inlet port 92*c*. The introduced water flow rate acquiring device 78*c* and the flow rate acquiring device 74 of the first embodiment may be a differential pressure flow meter, a capacitive flow meter, an electronic flow meter, an ultrasonic flow meter, a vortex flow meter, a turbine flow meter, a mass flow meter, a variable area flow meter, and an open channel flow meter, but the kind thereof is not limited thereto.

A main check valve 84*c* may be disposed in the main passage 90*c*. The main check valve 84*c* may be disposed at a point on an upstream side of a point, to which the water inlet port 92*c* in the main passage 90*c* is connected. The main check valve 84*c* may be a check valve that allows the water to flow only in the circulation direction D1 that is a direction, in which the water flows in the main passage 90*c*, but the kind thereof is not limited thereto.

A water softening module (not illustrated) may be disposed in the main passage 90*c*. The water softening module is a device for removing ionic materials included in the water flowing in the main passage 90*c*, and may be disposed on a downstream side of the water inlet port 92*c* with respect to the circulation direction D1. The water softening module may include an ion exchanging resin, and may be an electro deionization (EDI) or capacitive deionization (CDI) module that removes ionic materials by using electrical attractive forces, but the kind thereof is not limited thereto.

Fourth Embodiment

Figure 14:
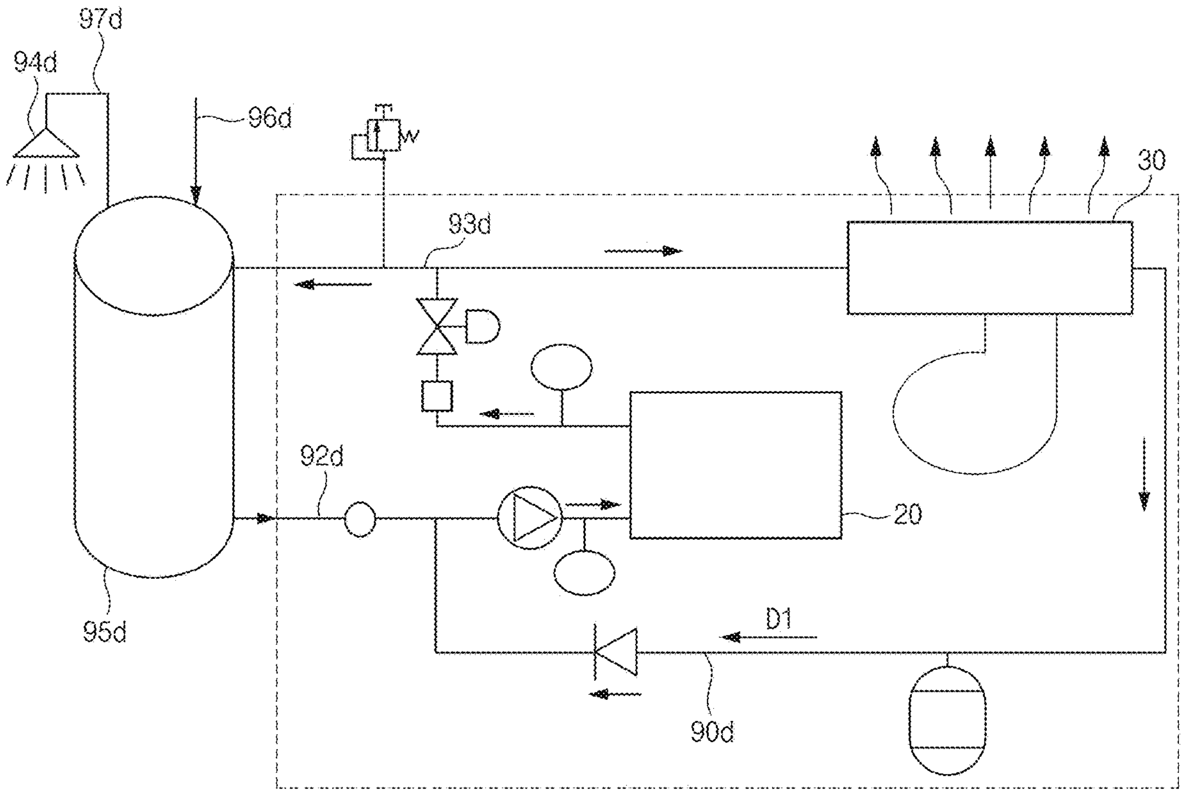
FIG. 14 is a view conceptually illustrating an air heating apparatus according to a fourth embodiment of the present disclosure.

FIG. 14 is a view conceptually illustrating an air heating apparatus according to a fourth embodiment of the present disclosure.

The air heating apparatus according to the fourth embodiment of the present disclosure is mainly different from the air heating apparatus according to the third embodiment of the present disclosure in that a storage tank 95*d* and other elements are additionally disposed, and thus only the different parts will be further described, and the description of the constituent elements of the air heating apparatus according to the third embodiment may be applied to the other constituent elements as they are.

The air heating apparatus according to the fourth embodiment may include the storage tank 95*d*. The storage tank 95*d* is a container having a space that may accommodate water in an interior thereof. The storage tank 95*d* may be connected to a water inlet port 92*d*, and may deliver the water accommodated in the interior thereof to a main passage 90*d*. The storage tank 95*d* may be connected to a hot water discharge port 93*d*, and the water received from the main passage 90*d* by the hot water discharge port 93*d* may be delivered to the storage tank 95*d*. The storage tank 95*d* may have a part, in which the water that is to be provided to the main passage 90*d* is stored, and a part, in which the water delivered to the storage tank 95*d* through the hot water discharge port 93*d* is stored. The hot water discharge port 93*d* according to the fourth embodiment may not be directly connected to a discharge device 94*d*, but may be connected thereto by a medium of the storage tank 95*d*.

A tank discharge port 97*d* may be connected to the storage tank 95*d*. Through the tank discharge port 97*d*, the water heated by the heat exchanging device 22 and delivered from the main passage 90*d* to the storage tank 95*d* may be discharged to the outside of the storage tank 95*d*. A distal end of the tank discharge port 97*d* may be coupled to a faucet or a shower head that is the discharge device 94*d* that supplies the heated hot water to a source of demand.

A tank introduction port 96*d* may be connected to the storage tank 95*d*. Through the tank introduction port 96*d*, the water from an external water source may be introduced into the storage tank 95*d*. The water introduced into the storage tank 95*d* through the tank introduction port 96*d* may be introduced into the main passage 90*d* through the water inlet port 92*d*.

Fifth Embodiment

Figure 15:
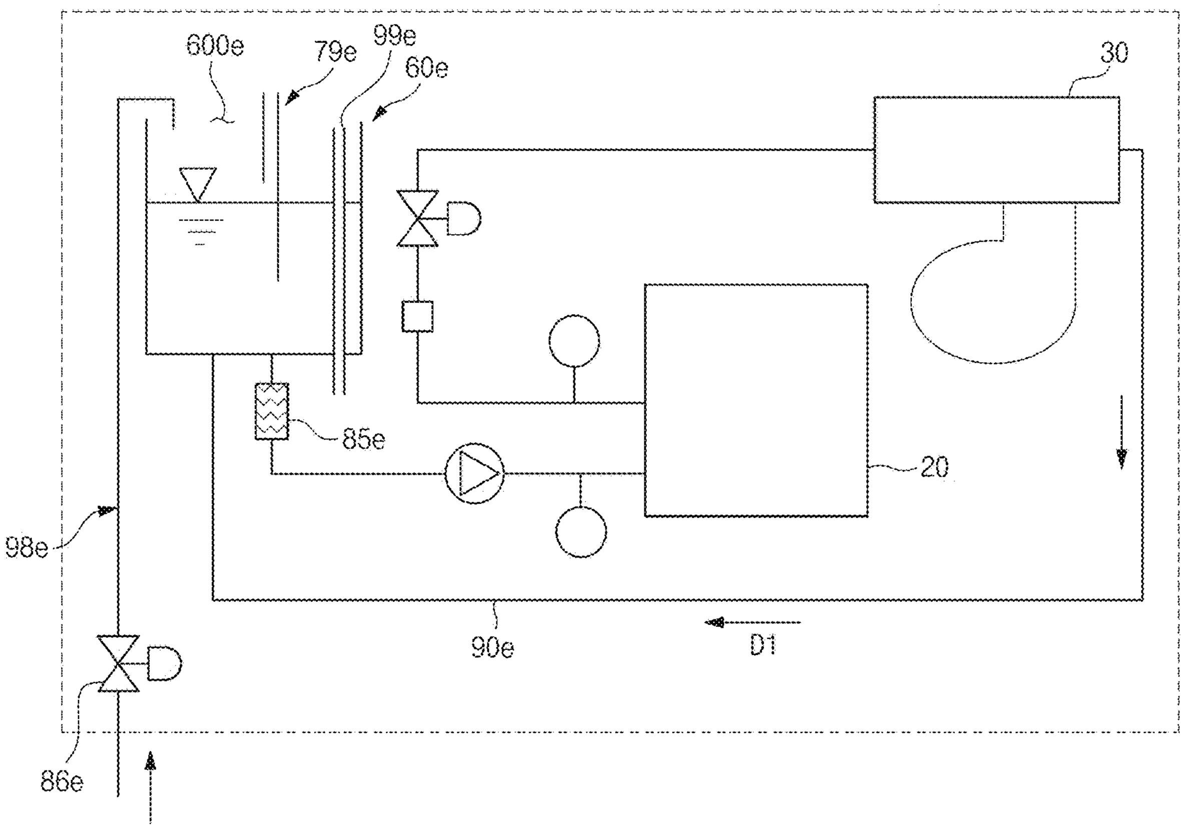
FIG. 15 is a view conceptually illustrating an air heating apparatus according to a fifth embodiment of the present disclosure.

FIG. 15 is a view conceptually illustrating an air heating apparatus according to a fifth embodiment of the present disclosure.

When the water is consistently supplied to the main passage of the air heating apparatus and discharged from the main passage, a unit that may consistently supply the water to the air heating apparatus is essential, and a problem, such as degradation of performance or a breakdown due to scales, may be caused in the main passage and the components connected to the main passage.

The air heating apparatus according to the fifth embodiment of the present disclosure is mainly different from the air heating apparatus 1 according to the first embodiment of the present disclosure in that an open type expansion tank is additionally disposed in the main passage 90 of the air heating apparatus 1 according to the first, and thus only the different parts will be further described, and the description of the constituent elements of the air heating apparatus 1 according to the first embodiment may be applied the other constituent elements as they are. The water inlet port 92 and the water supplementing valve 82 may not be disposed in the air heating apparatus according to the fifth embodiment.

The air heating apparatus according to the fifth embodiment of the present disclosure may include an expansion tank 60e. The expansion tank 60e according to the fifth embodiment is an opened container having an expansion opening 600e that is opened to the outside, unlike the expansion tank 60 that is a closed container included in the air heating apparatus 1 according to the first embodiment. The expansion tank 60e is a container that is disposed in a main passage 90e to accommodate a change in the volume of the water that flows along the main passage and has the expansion opening 600e. The expansion opening 600e may be formed as an upper end of the expansion tank 60e is opened, but the location of the expansion opening 600e is not limited thereto.

Due to the expansion tank 60e, the main passage 90e may be not a closed circuit but an open circuit. Accordingly, it may be determined that the constituent elements of the air heating apparatus according to the fifth embodiment are not pressure vessels, and thus the air heating apparatus according to the fifth embodiment may be stably operated even though the constituent elements that may maintain the pressure-resistant performance or solve the pressure are not included. Furthermore, because the water is supplemented through the expansion tank 60e, a constituent element, such as the water inlet port for introduction of the water into the main passage 90e or the check valve disposed in the water inlet port, may not be necessary. Accordingly, economic efficiency may be secured in manufacturing the air heating apparatus.

Furthermore, an inconvenience of having to continuously supplementing the water as the water in the main passage 90e of the air heating apparatus is frequently discharged to the outside to be used as hot water and the like may be solved, and a problem, in which lime scales are generated in the main passage 90e when the water is continuously supplemented to the main passage 90e, may be prevented.

Furthermore, because the water may be supplemented by introducing the water through the expansion opening 600e of the opened expansion tank 60e, a restriction of having to install the air heating apparatus only at a location, at which a source water pipeline connected to the water source may be installed, may be solved, whereby the air heating apparatus may be installed in an attic or the like, in which it is difficult to dispose the source water pipeline.

Furthermore, because it is not necessary to connect the air heating apparatus to a unit that continuously supplies the water, even an operator who is not skilled in dealing with water pipelines may easily install the air heating apparatus.

The air heating apparatus according to the fifth embodiment of the present disclosure may include a water supplementing pipeline 98e. The water supplementing pipeline 98e is a pipeline configured to supplement the water in the expansion tank 60e. One end of the water supplementing pipeline 98e may be connected to the water source. The water delivered from the water source may be discharged from an opposite end of the water supplementing pipeline 98e. A distal end of the water supplementing pipeline 98e, from which the water is discharged, may be disposed adjacent to the expansion opening 600e such that the discharged water drops to be supplemented in the expansion tank 60e. As illustrated, the water supplementing pipeline 98e may pass through the expansion opening 600e, but the location thereof is not limited thereto, and the distal end of the water supplementing pipeline 98e may be disposed at a location spaced upwards from the expansion opening 600e.

The air heating apparatus according to the fifth embodiment of the present disclosure may further include a water level acquiring device 79e. The water level acquiring device 79e may acquire a level of the water accommodated in the expansion tank 60e. The water level acquiring device 79e may be a contact type water level sensor for the operation, or may be a noncontact type water level sensor that determines a water level by using light reflected after the light is irradiated to the accommodated water, but the kind thereof is not limited thereto. Because the water level acquiring device 79e is disposed in the expansion tank 60e, it may be recognized whether the water is lack even when a component such as the water lack determining device 77b used in the second embodiment is not used.

The air heating apparatus according to the fifth embodiment of the present disclosure may include a filling valve 86e. The filling valve 86e may supplement the water in the expansion tank 60e or stop supplementing the water by adjusting opening and closing the water supplementing pipeline 98e. The filling valve 86e may be opened such that the water is supplemented in the expansion tank 60e when the water level acquired by the water level acquiring device 79e is less than a specific threshold level. As the filling valve 86e is opened, the water may be automatically supplemented in the expansion tank 60e by a pressure of the source water in the water source, similarly to the case, in which the faucet is used. The filling valve 86e may be closed such that the water is not supplemented when the acquired water level is the threshold level or more. For the operation, the filling valve 86e and the water level acquiring device 79e may be electrically connected to the processor "P". The information on the water level acquired by the water level acquiring device 79e may be delivered to the processor "P" in a form of an electric signal, and the processor "P" may control the filling valve 86e based on the delivered information.

The air heating apparatus according to the fifth embodiment of the present disclosure may include a drain pipeline 99e. The drain pipeline 99e is a pipeline that is connected to the expansion tank 60e such that the level of the water accommodated in the expansion tank 60e is maintained at a limit water level or less by discharging the water accommodated in the expansion tank 60e. As illustrated, the drain pipeline 99e passes through the expansion tank 60e such that an upper end of the drain pipeline 99e is located in the expansion tank 60e and is disposed on a lower side of the expansion opening 600e. Accordingly, when the water flows upwards in the expansion tank 60e to be higher than the upper end of the drain pipeline 99e, the water may be introduced through the upper end of the drain pipeline 99e and discharged to an outside along the drain pipeline 99e. Because the drain pipeline 99e is disposed, the water may be prevented from overflowing from the expansion tank 60e.

The air heating apparatus according to the fifth embodiment of the present disclosure may include a filtering device 85e. The filtering device 85e is a device that filters out foreign substances from the water that is supplemented from the expansion tank 60e to the main passage 90e. The filtering device 85e may be disposed on a downstream side of the expansion tank 60e with respect to the circulation direction D1 on the main passage 90e, and may function to filter out the foreign substances contained in the water discharged from the expansion tank 60e. The filtering device 85e may be a strainer or a porous filter that is a kind of a valve, but the device that filters out the foreign substances is not limited thereto.

The air heating apparatus according to the fifth embodiment of the present disclosure may be installed at various locations, and in particular, when it is installed in an attic or the like, the air heating apparatus may be designed such that the heating heat exchanger 30 is located on a lower side of the water heater 20, and may be used in a scheme, in which the heated air is delivered to the respective rooms through the ducts located on the lower side of the air heating apparatus.

According to the present disclosure, an air heating apparatus that heats air by using water may be used.

According to the present disclosure, because water is used for heating air and combustion gas is used only for heating water and is separated and discharged, a danger of damage to a tube, in which the water flows, is reduced, and a danger of leaking combustion gas, which is provided to respective rooms, is reduced even when the tube is damaged.

According to the present disclosure, because air is not overheated as air is heated by using water instead of combustion gas, the heated air may be provided in a state in which the air is prevented from being dried without a separate humidity adjusting device.

According to the present disclosure, because the air heating apparatus having a remarkably increased turn-down ratio may be provided, a proper operation may be performed at a time point, at which a low-load operation is necessary, and an efficiency of the air heating apparatus may be enhanced and operation noise may be reduced.

According to the present disclosure, a space that is necessary for installing the air heating apparatus may be reduced, and a thermal loss, costs, and a danger of damage, which may be caused when a constituent element that connect the respective constituent element is disposed unnecessarily long.

According to the present disclosure, because the air heating apparatus is integrally formed, a control may be made in an optimum state as a thermal medium and the constituent elements related to the air may easily interwork with each other to be used for the control, efficiency may be increased, and the air heating apparatus may be easily installed at the same location in replacement of an existing gas furnace.

According to the present disclosure, the air heating apparatus may be designed to have stability as a pressure vessel.

According to the present disclosure, the air heating apparatus may be installed at various sites.

In the above description, the constituent elements included in the embodiments may be applied to another embodiment as long as they are not contradictory with the constituent elements included in the other embodiments.

The above description is a simple exemplification of the technical spirits of the present disclosure, and the present disclosure may be variously corrected and modified by those skilled in the art to which the present disclosure pertains without departing from the essential features of the present disclosure. Accordingly, the embodiments disclosed in the present disclosure is not provided to limit the technical spirits of the present disclosure but provided to describe the present disclosure, and the scope of the technical spirits of the present disclosure is not limited by the embodiments. Accordingly, the technical scope of the present disclosure should be construed by the attached claims, and all the technical spirits within the equivalent ranges fall within the scope of the present disclosure.

What is claimed is:

1. An air heating apparatus comprising:

a burner configured to cause a combustion reaction;

a main passage, through which water flows while circulating;

a heat exchanger configured to receive heat from combustion gas generated by the combustion reaction and heat the water flowing along the main passage;

a heating heat exchanger configured to receive the water heated by the heat exchanger and exchange heat with air for heating;

a fan configured to blow the air to the heating heat exchanger;

an expansion tank disposed in the main passage to accommodate a change in a volume of the water and having an expansion opening opened to an outside;

a water supplementing pipeline configured to supplement the water in the expansion tank;

a drain pipeline connected to the expansion tank and having an upper end located within the expansion tank and disposed on a lower side of the expansion opening, such that a level of the water accommodated in the expansion tank is maintained at less than a limit water level by discharging the water accommodated in the expansion tank;

wherein a distal end of the water supplementing pipeline, from which the water is discharged, is disposed adjacent to the expansion opening such that the discharged water drops into the expansion tank to supplement the water accommodated therein; and a processor configured to control a temperature of the water that passes through the heating heat exchanger through the main passage and is returned to the heat exchanger as returning water, wherein the processor is configured to:

control the temperature of the returning water by controlling a flow rate of the water, and wherein the processor is electrically connected to the burner to adjust a heat output generated in the combustion reaction through control of the combustion reaction caused by the burner, and wherein the heat exchanger includes:

a sensible heat exchanger configured to receive the heat generated by the combustion reaction and heat the water that flows through an interior thereof; and a latent heat exchanger configured to heat the water that flows through the interior thereof by using latent heat of the combustion gas generated by the combustion reaction.

2. The air heating apparatus of claim 1, further comprising:

a water level sensor configured to acquire the level of the water accommodated in the expansion tank.

3. The air heating apparatus of claim 2, further comprising:

a filling valve configured to adjust opening/closing of the water supplementing pipeline, and being opened such that the water is supplemented in the expansion tank when the level of the water acquired by the water level sensor is less than a threshold water level.

4. The air heating apparatus of claim 1, further comprising:

a filter disposed in the main passage and configured to filter out foreign substances from the water supplemented in the main passage from the expansion tank.

5. The air heating apparatus of claim 1, further comprising:

a water temperature sensor electrically connected to the processor and configured to acquire the temperature of the returning water, wherein the processor is configured to:

control the flow rate of the water based on a preset water temperature and an acquisition water temperature that is the water temperature acquired by the water temperature sensor.

6. The air heating apparatus of claim 5, wherein the processor is configured to:

control such that the flow rate of the water is decreased when the acquisition water temperature is higher than the preset water temperature.

7. The air heating apparatus of claim 1, further comprising:

a flow rate control valve disposed in the main passage to adjust the flow rate of the water that flows along the main passage through opening and closing thereof, and electrically connected to the processor to be controlled.

8. The air heating apparatus of claim 1, further comprising:

a pump disposed in the main passage to pump the water, wherein the pump is electrically connected to the processor.

9. The air heating apparatus of claim 1, further comprising:

an air temperature sensor electrically connected to the processor and configured to acquire a temperature of a returning air; and a flow meter electrically connected to the processor and configured to acquire the flow rate of the water that flows through the main passage, wherein the processor is configured to:

control the flow rate of the water and the heat energy based on a mapping table, in which the temperature of the returning air, the flow rate of the water and the heat energy correspond to each other, and a preset air temperature.

10. An air heating apparatus comprising:

a burner configured to cause a combustion reaction;

a main passage, through which water flows while circulating;

a heat exchanger configured to receive heat from combustion gas generated by the combustion reaction and heat the water flowing along the main passage;

a heating heat exchanger configured to receive the water heated by the heat exchanger and exchange heat with air for heating;

a fan configured to blow the air to the heating heat exchanger;

an expansion tank disposed in the main passage to accommodate a change in a volume of the water and having an expansion opening opened to an outside;

a processor configured to control a temperature of the water that passes through the heating heat exchanger through the main passage and is returned to the heat exchanger; and wherein the processor is further configured to:

control a temperature of the returning water by controlling a flow rate of the water, and wherein the processor is electrically connected to the burner to adjust a heat energy generated in the combustion reaction through control of the combustion reaction caused by the burner, and wherein the heat exchanger includes:

a sensible heat exchanger configured to receive the heat generated by the combustion reaction and heat the water that flows through an interior thereof; and a latent heat exchanger configured to heat the water that flows through the interior thereof by using latent heat of the combustion gas generated by the combustion reaction.

11. The air heating apparatus of claim 10, wherein the sensible heat exchanger and the latent heat exchanger are disposed in the main passage such that the water is introduced into the sensible heat exchanger via the latent heat exchanger, wherein the processor is configured to control such that the temperature of the water returning to the heat exchanger is maintained in a temperature that is lower than or equal to a preset water temperature, and wherein the preset water temperature is lower than a maximum water temperature of the water returning to the latent heat exchanger, by which the combustion gas is condensed in the latent heat exchanger.

12. The air heating apparatus of claim 1, further comprising:

an air temperature sensor electrically connected to the processor and configured to acquire a temperature of a returning air;

a flow meter electrically connected to the processor and configured to acquire a flow rate of the water that flows through the main passage; and a case, in which the processor, the burner, the heat exchanger, the heating heat exchanger, the fan, the air temperature sensor, and the flow meter are embedded, wherein the processor is configured to:

control the temperature of the returning water based on the temperature acquired by the air temperature sensor and the flow rate acquired by the flow meter.

13. The air heating apparatus of claim 1, wherein the heating heat exchanger includes a heat exchange tube, through which the water heated by the heat exchanger flows to exchange heat with the air that flows a periphery thereof.

14. The air heating apparatus of claim 13, wherein the heat exchange tube forms a plurality of layers disposed at different locations according to a specific direction such that the introduced water flows along the specific direction to be discharged, and wherein the specific direction is an opposite direction to a direction in which the fan blows the air.

* * * * *